(12) United States Patent
Frenken

(10) Patent No.: US 7,086,979 B2
(45) Date of Patent: Aug. 8, 2006

(54) FRICTION-WHEEL PLANETARY GEAR FOR CONVERTING A ROTATING MOVEMENT INTO A BACK AND FORTH MOVEMENT WITH DECREASED FREQUENCY

(75) Inventor: Egbert Frenken, Wermelskirchen (DE)

(73) Assignee: Gustav Klauke GmbH (DE)

( * ) Notice: Subject to any disclaimer, the term of this patent is extended or adjusted under 35 U.S.C. 154(b) by 132 days.

(21) Appl. No.: 10/477,339

(22) PCT Filed: May 17, 2002

(86) PCT No.: PCT/EP02/05453

§ 371 (c)(1),
(2), (4) Date: Apr. 15, 2004

(87) PCT Pub. No.: WO02/095264

PCT Pub. Date: Nov. 28, 2002

(65) Prior Publication Data

US 2004/0182189 A1      Sep. 23, 2004

(30) Foreign Application Priority Data

May 18, 2001   (DE) ................................ 101 24 265

(51) Int. Cl.
*F16H 9/26* (2006.01)
*F16H 13/14* (2006.01)
(52) U.S. Cl. .................... 475/182; 475/331; 475/195
(58) Field of Classification Search ................ 475/331, 475/182, 170, 185, 189, 195, 196, 335
See application file for complete search history.

(56) References Cited

U.S. PATENT DOCUMENTS

| | | | | |
|---|---|---|---|---|
| 2,578,801 | A | * | 12/1951 | Harshberger ................ 475/197 |
| 2,928,289 | A | | 3/1960 | Maroth |
| 3,403,668 | A | | 10/1968 | Schottler |
| 3,443,446 | A | | 5/1969 | Buergel |
| 3,659,971 | A | | 5/1972 | Schottler |
| 4,052,915 | A | | 10/1977 | Kraus |
| 4,060,010 | A | * | 11/1977 | Heden ........................ 475/183 |
| 5,037,361 | A | * | 8/1991 | Takahashi ................... 475/195 |
| 5,931,759 | A | * | 8/1999 | Otaki et al. ................ 475/195 |
| 6,186,020 | B1 | | 2/2001 | Butsch |
| 6,446,482 | B1 | | 9/2002 | Heskey et al. |
| 2004/0116218 | A1 | * | 6/2004 | Butsch et al. ................ 474/8 |

FOREIGN PATENT DOCUMENTS

| | | |
|---|---|---|
| DE | 19633556 | 4/1998 |
| EP | 0432766 | 6/1995 |
| GB | 1181881 | 2/1970 |
| WO | WO 972554 | 7/1997 |

* cited by examiner

*Primary Examiner*—Tisha Lewis
(74) *Attorney, Agent, or Firm*—Trexler, Bushnell, Giangiorgi, Blackstone & Marr, Ltd.

(57) ABSTRACT

A gear mechanism or motor includes a shaft, and output rotary bodies which are in engagement therewith. The bodies interact with the shaft in the radial direction, by bearing against the shaft, and interact in the axial direction of the shaft with an upper guideway body which can move in the axial direction and is loaded toward the bodies. An interaction region of the shaft has a circular cross section. A guideway of the guideway body is structured in terms of its height over its periphery.

44 Claims, 22 Drawing Sheets

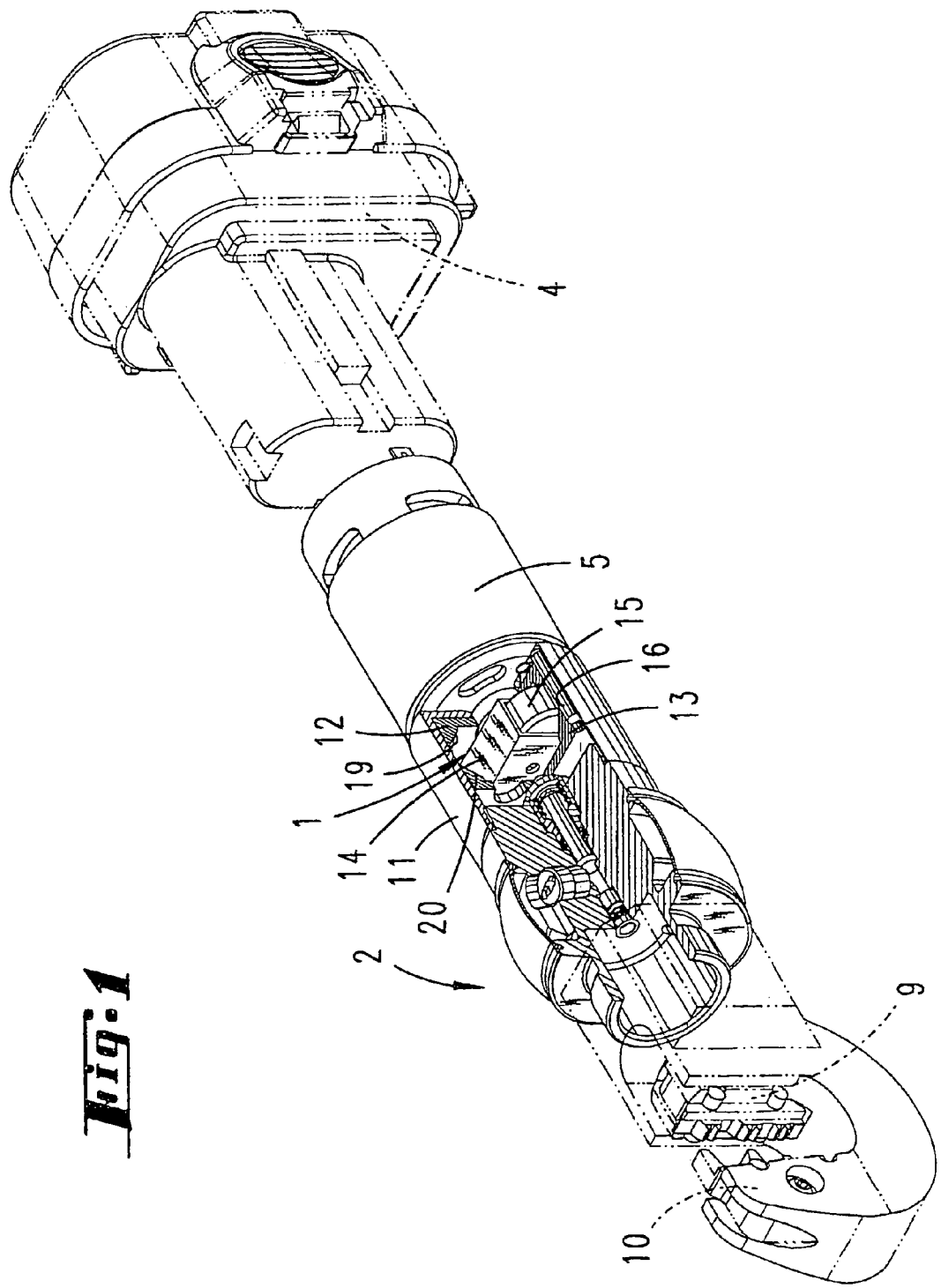

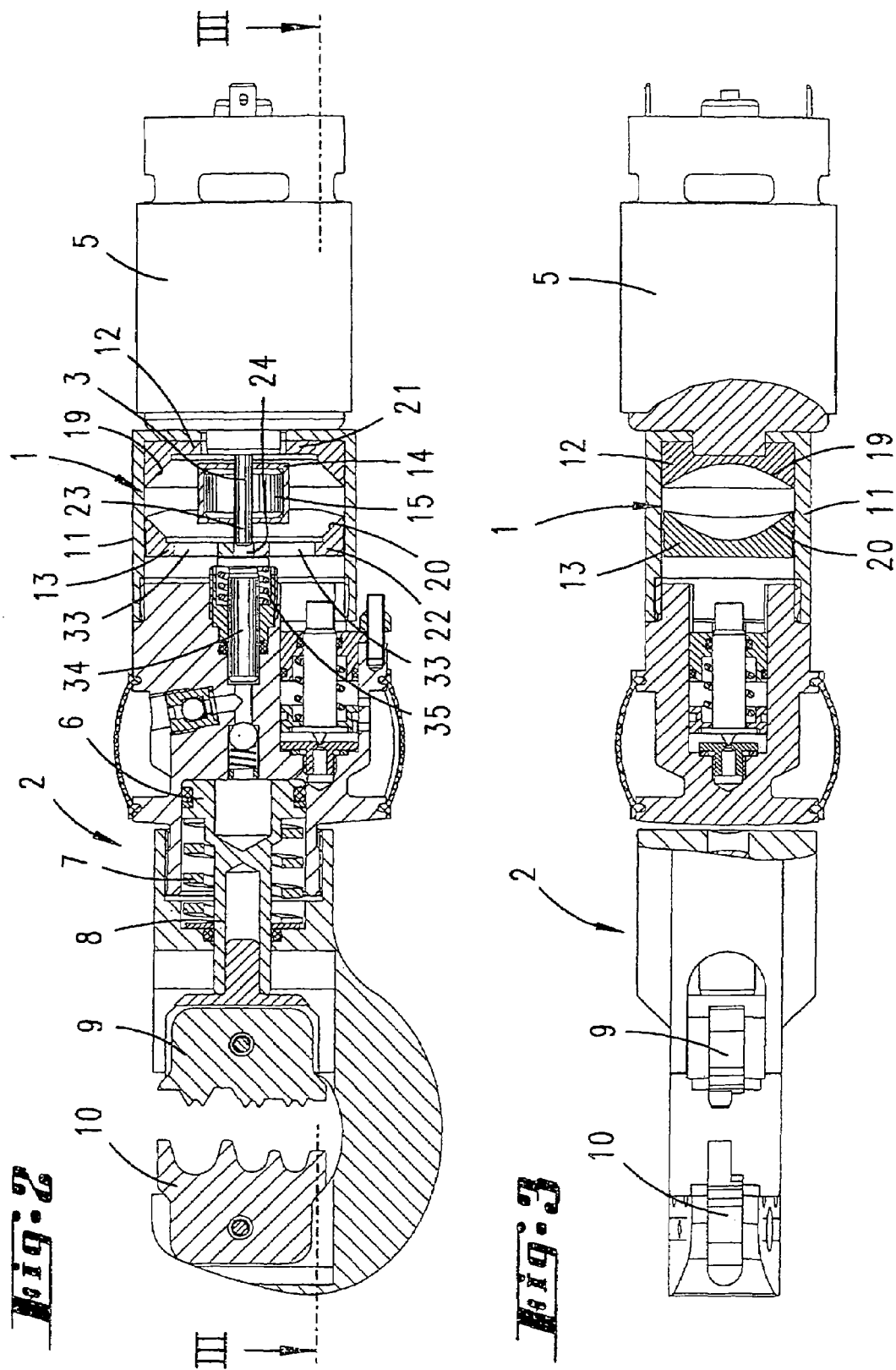

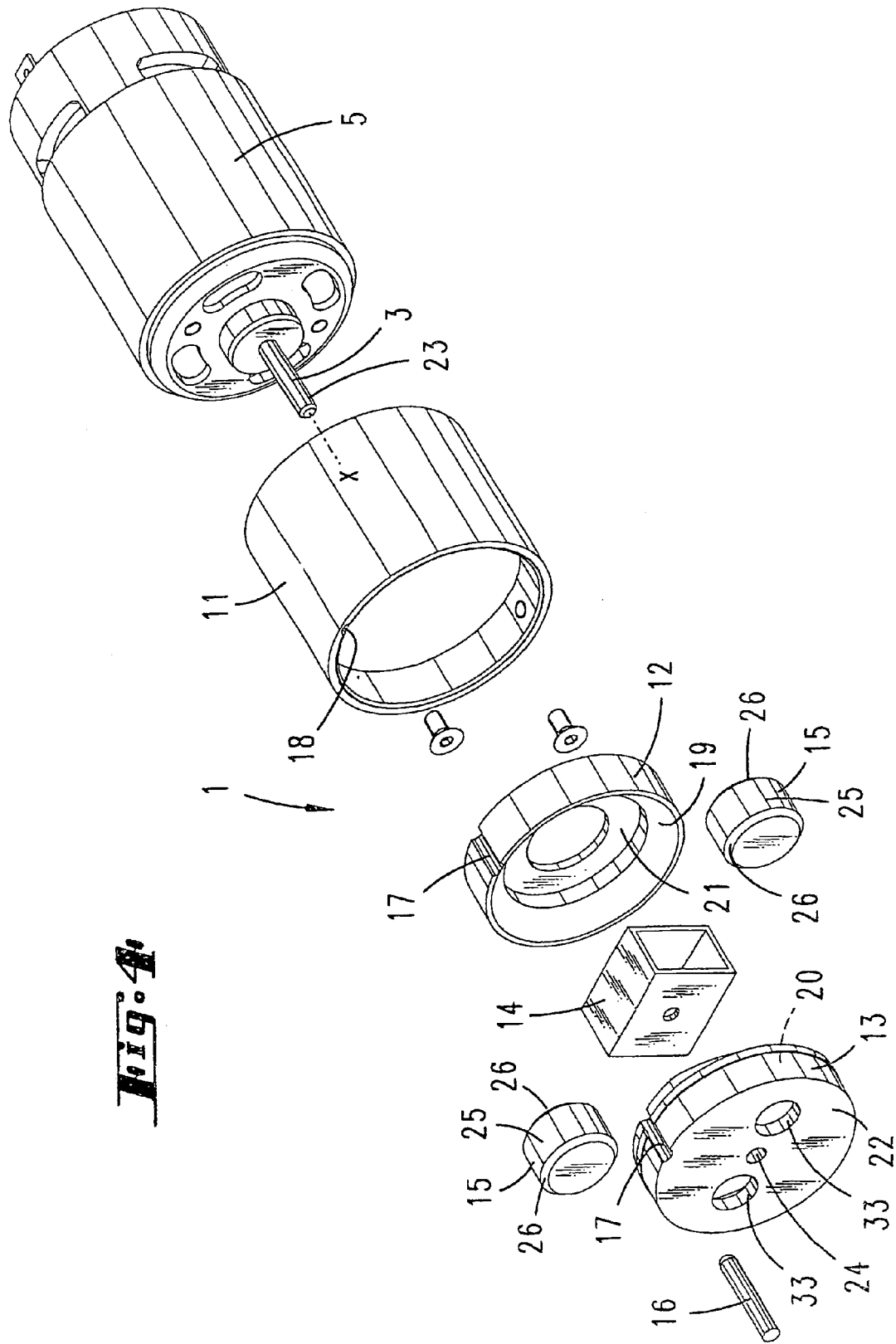

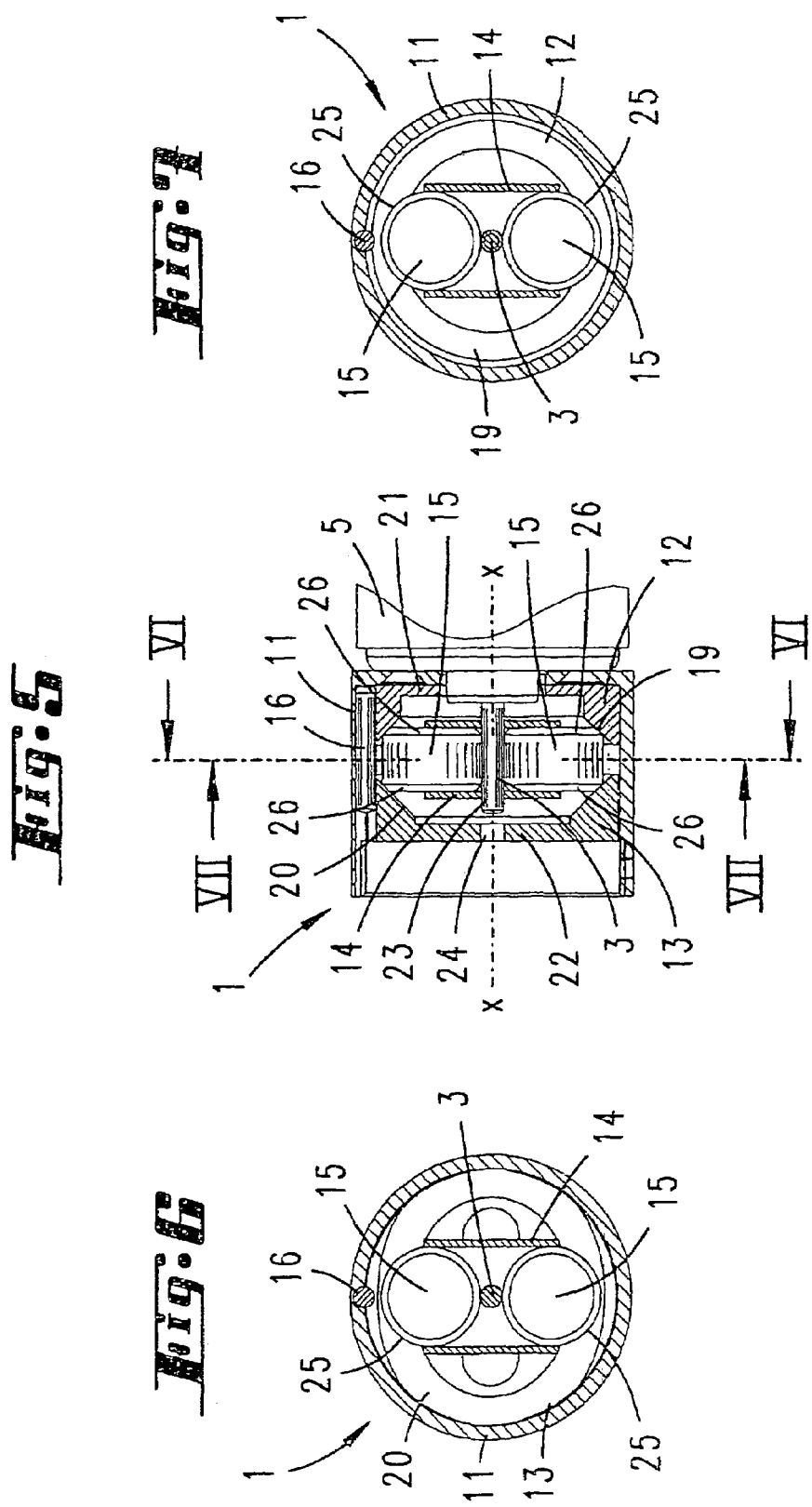

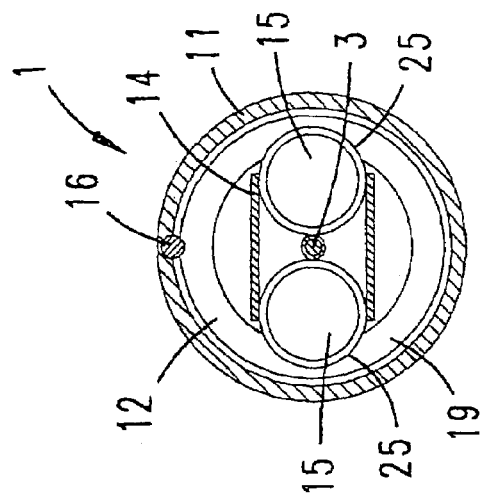
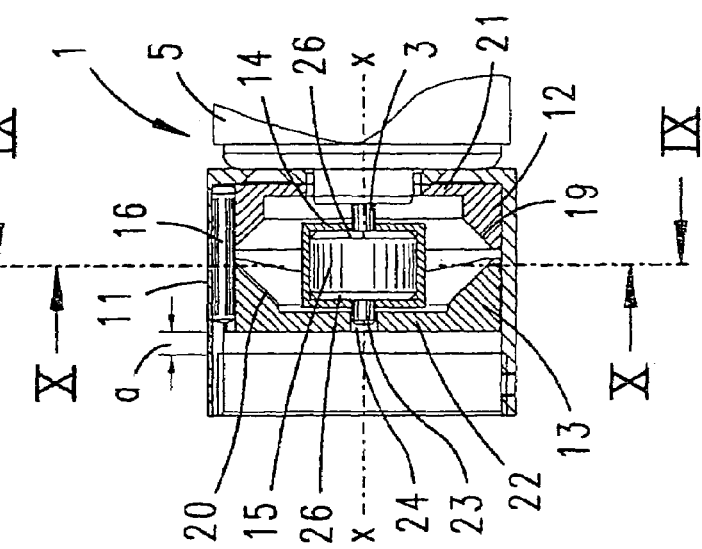
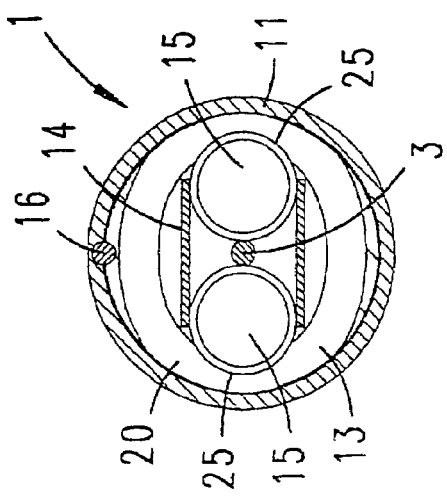

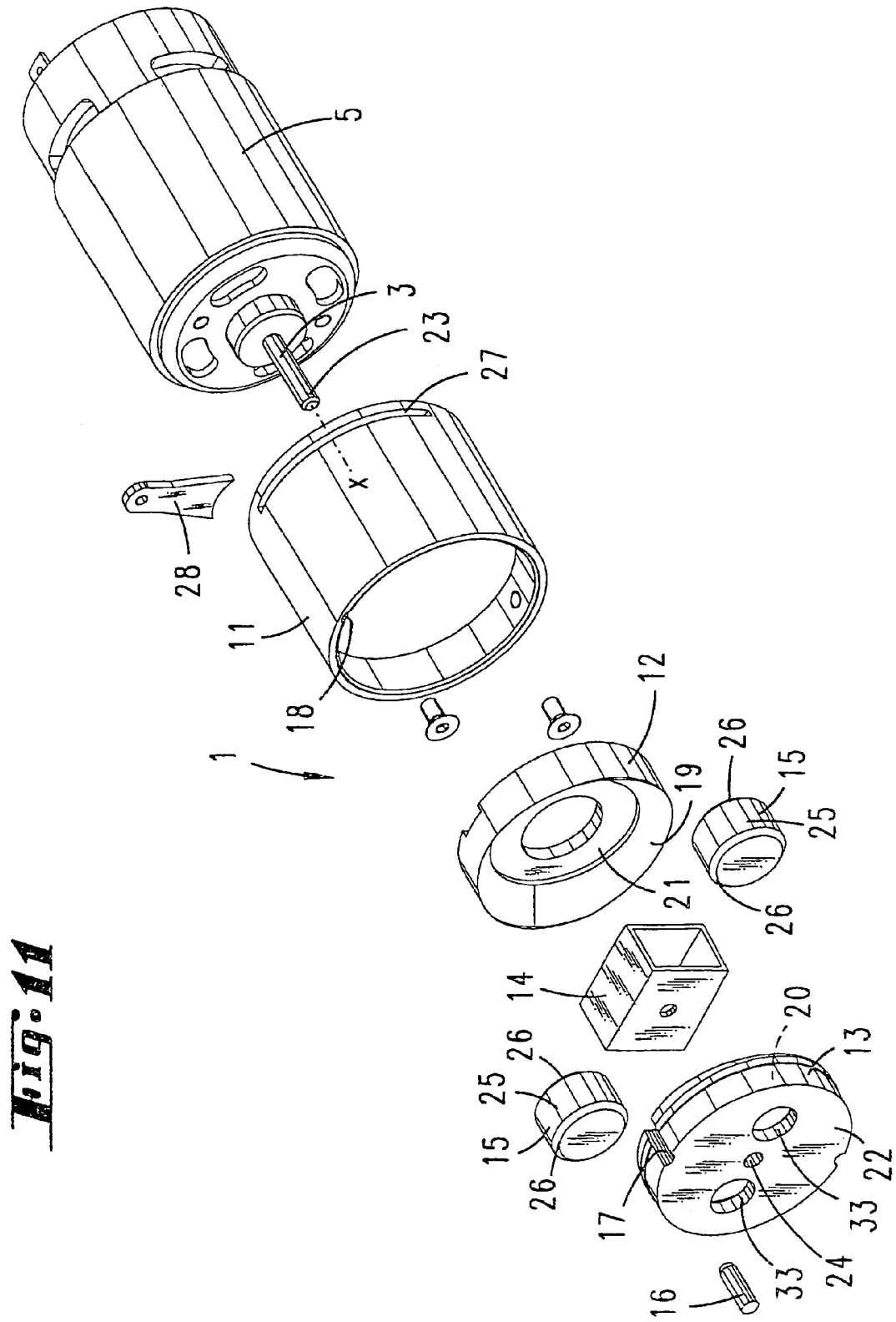

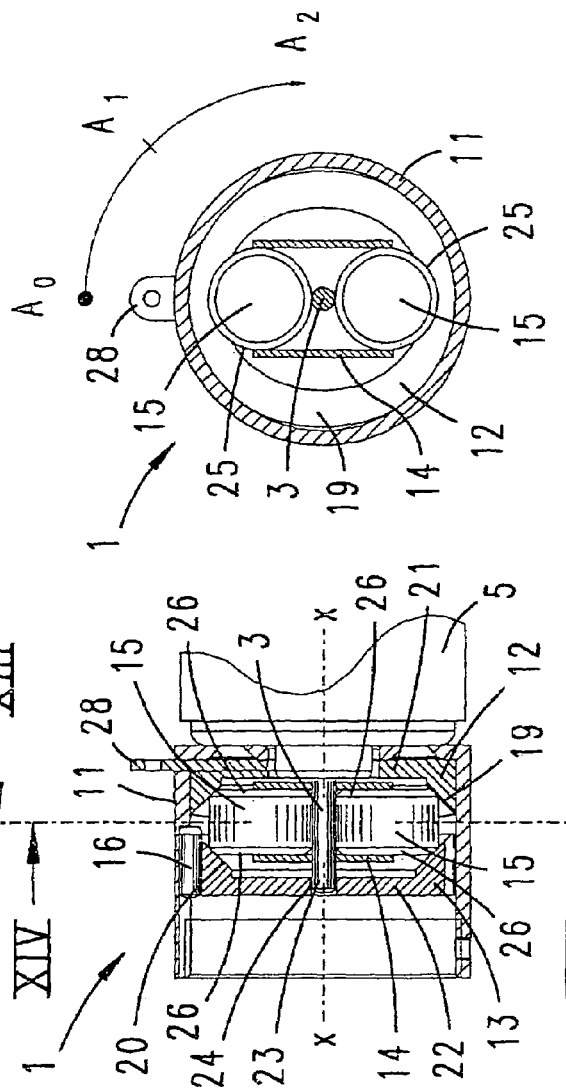
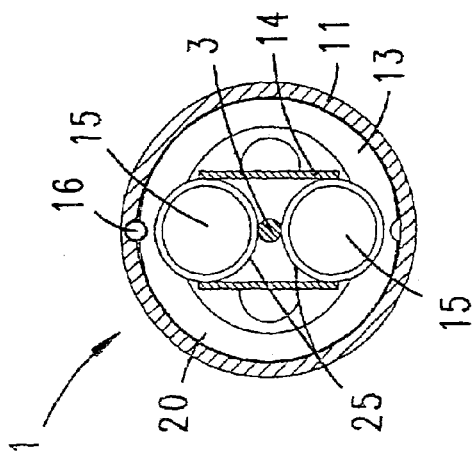
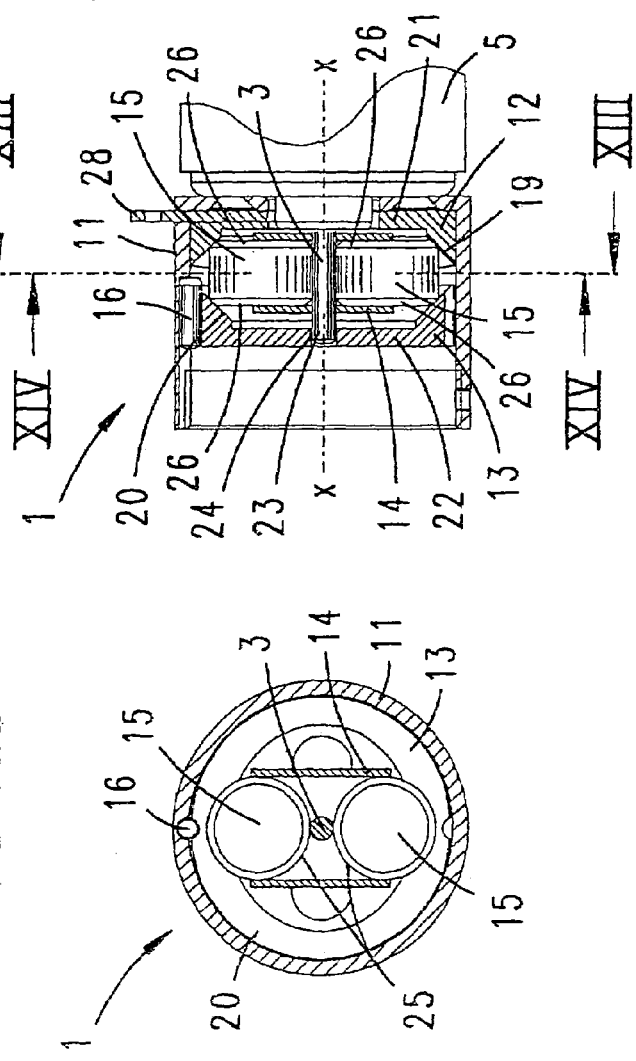

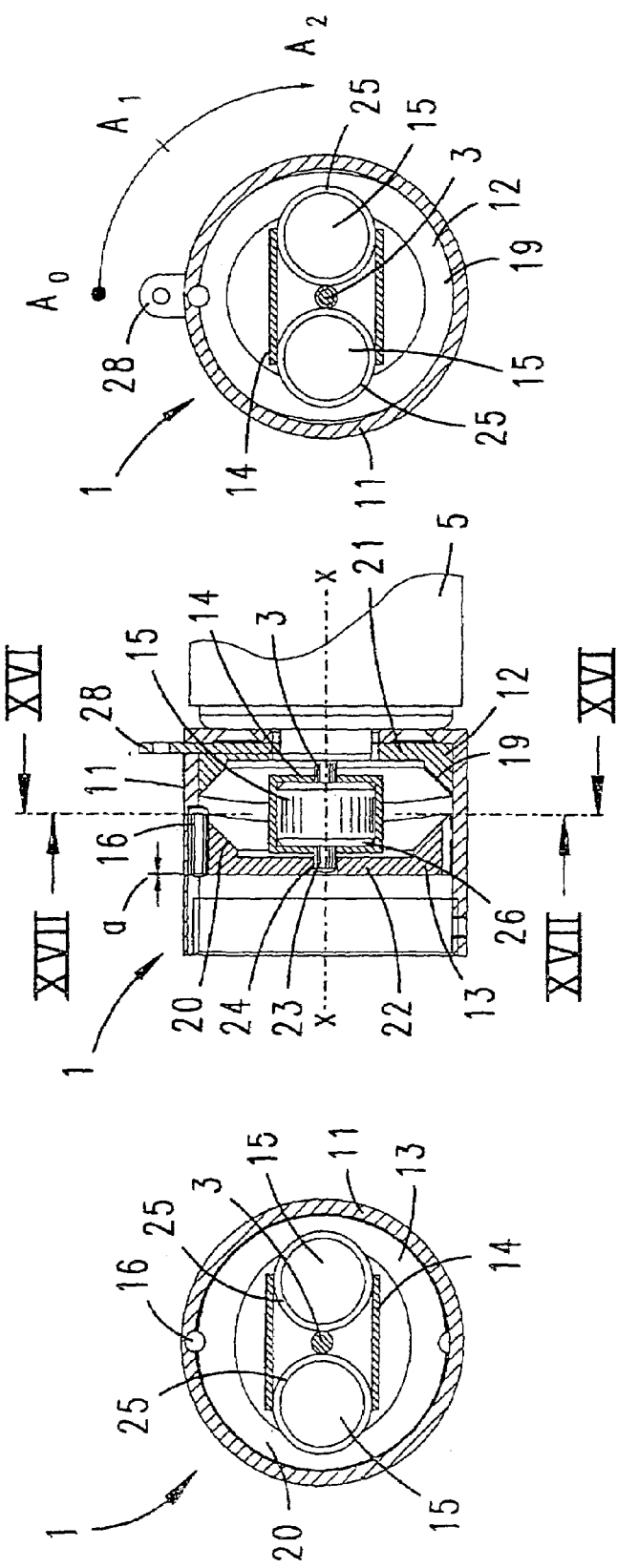

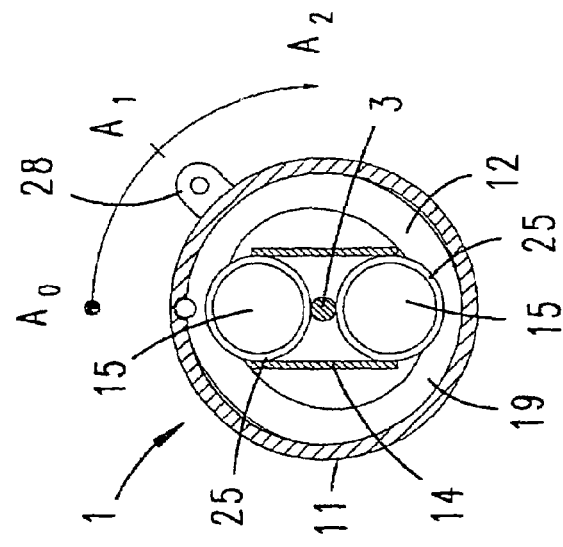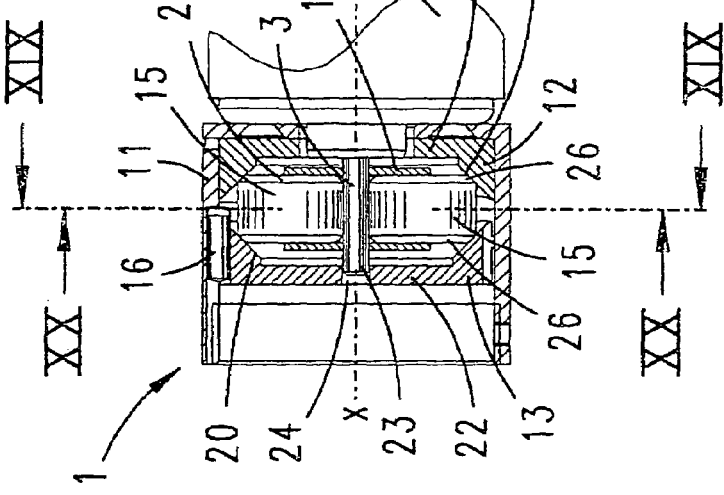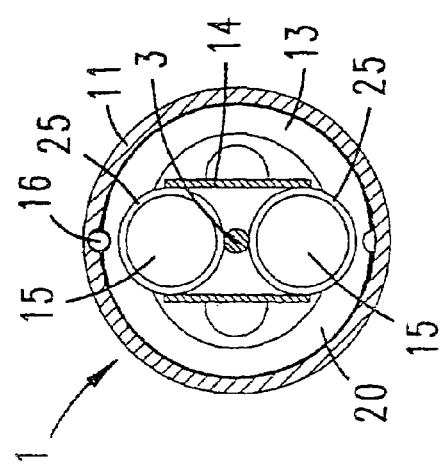

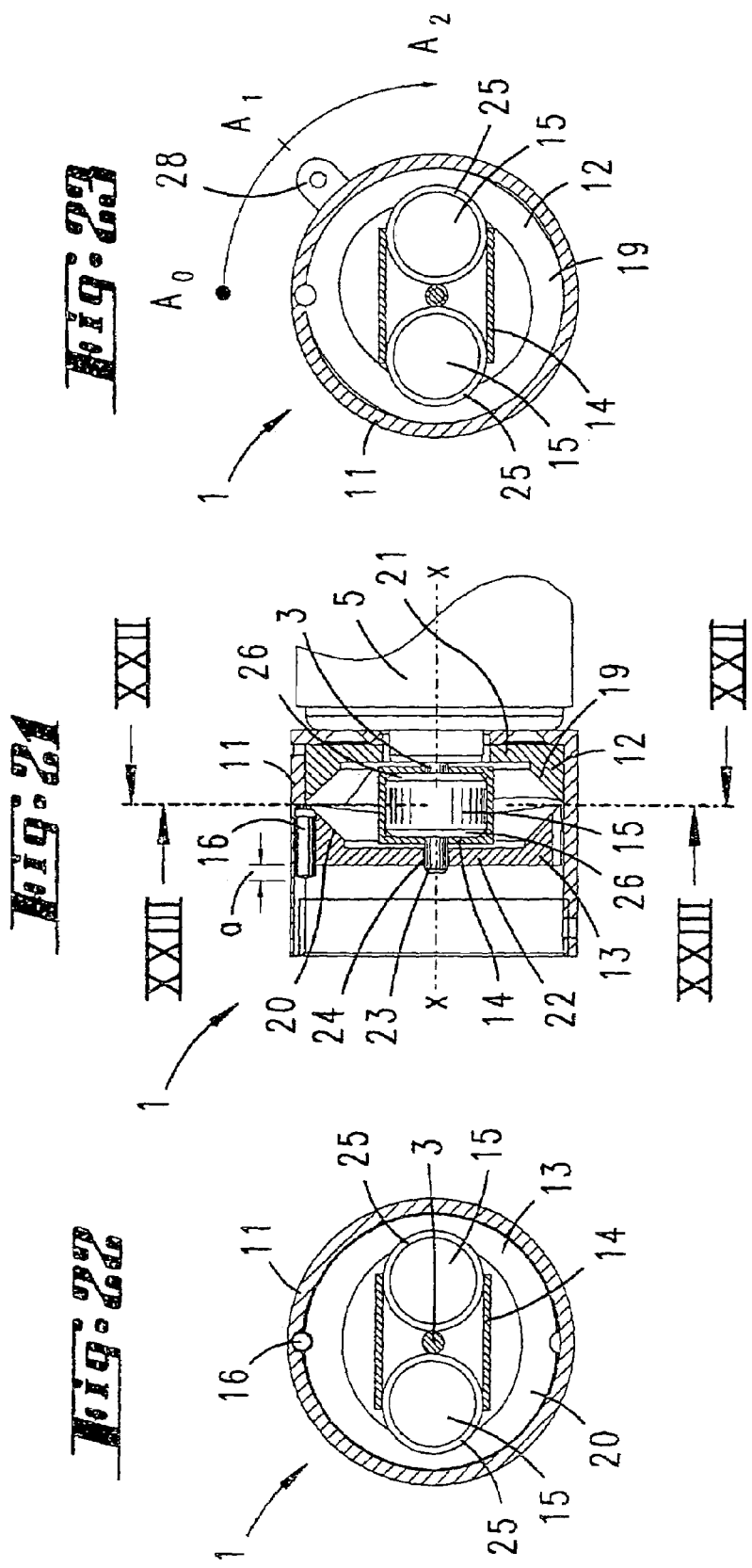

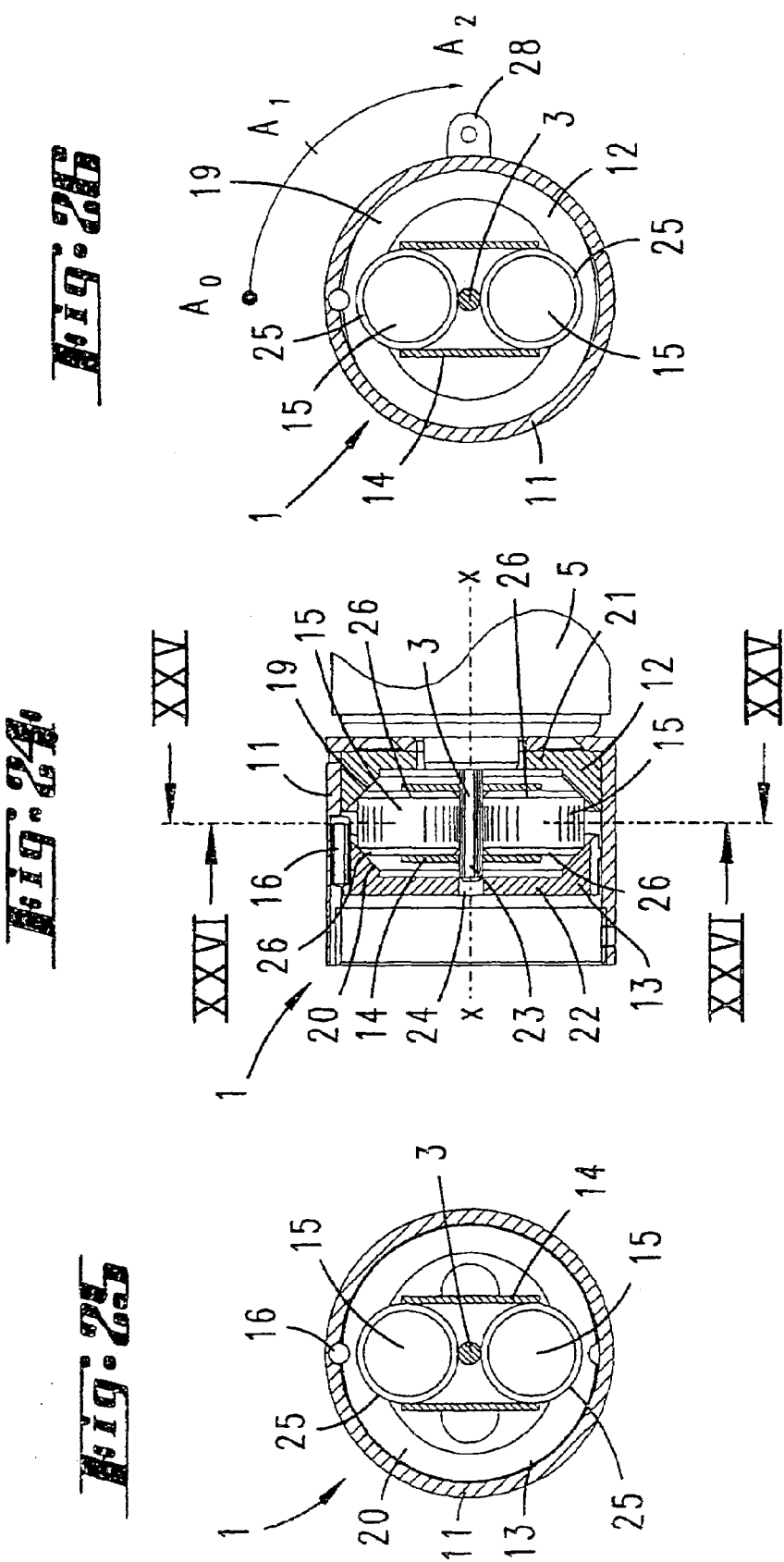

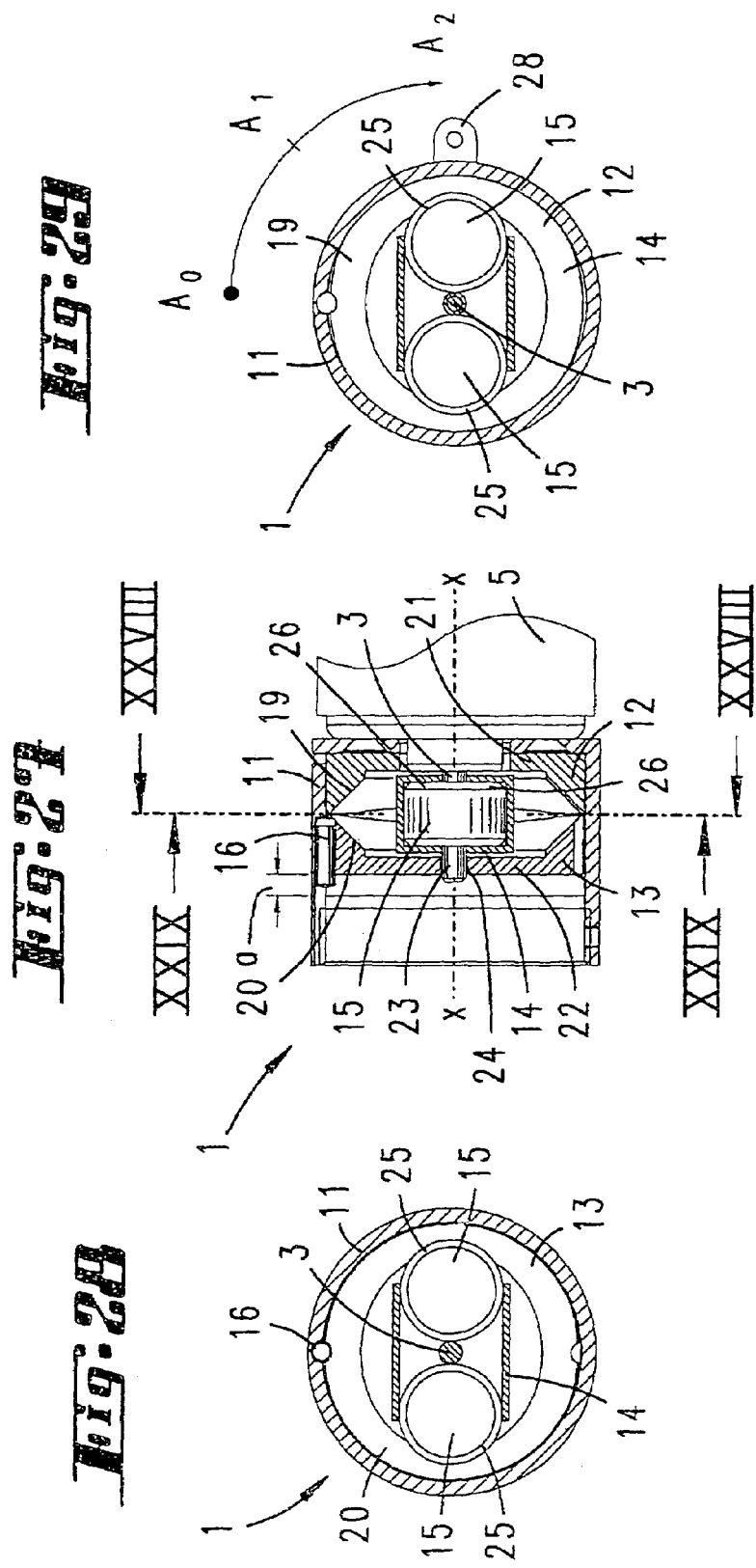

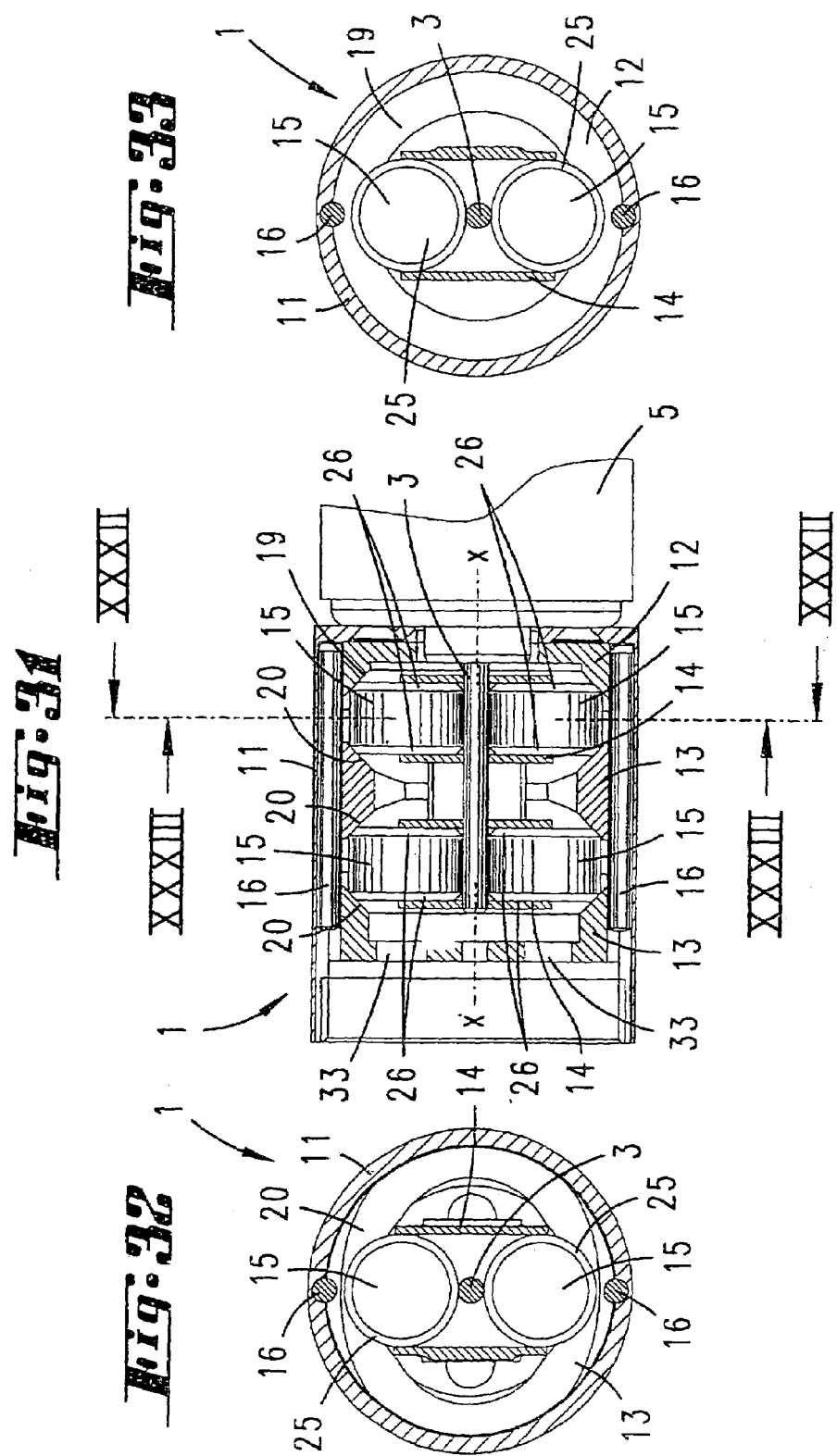

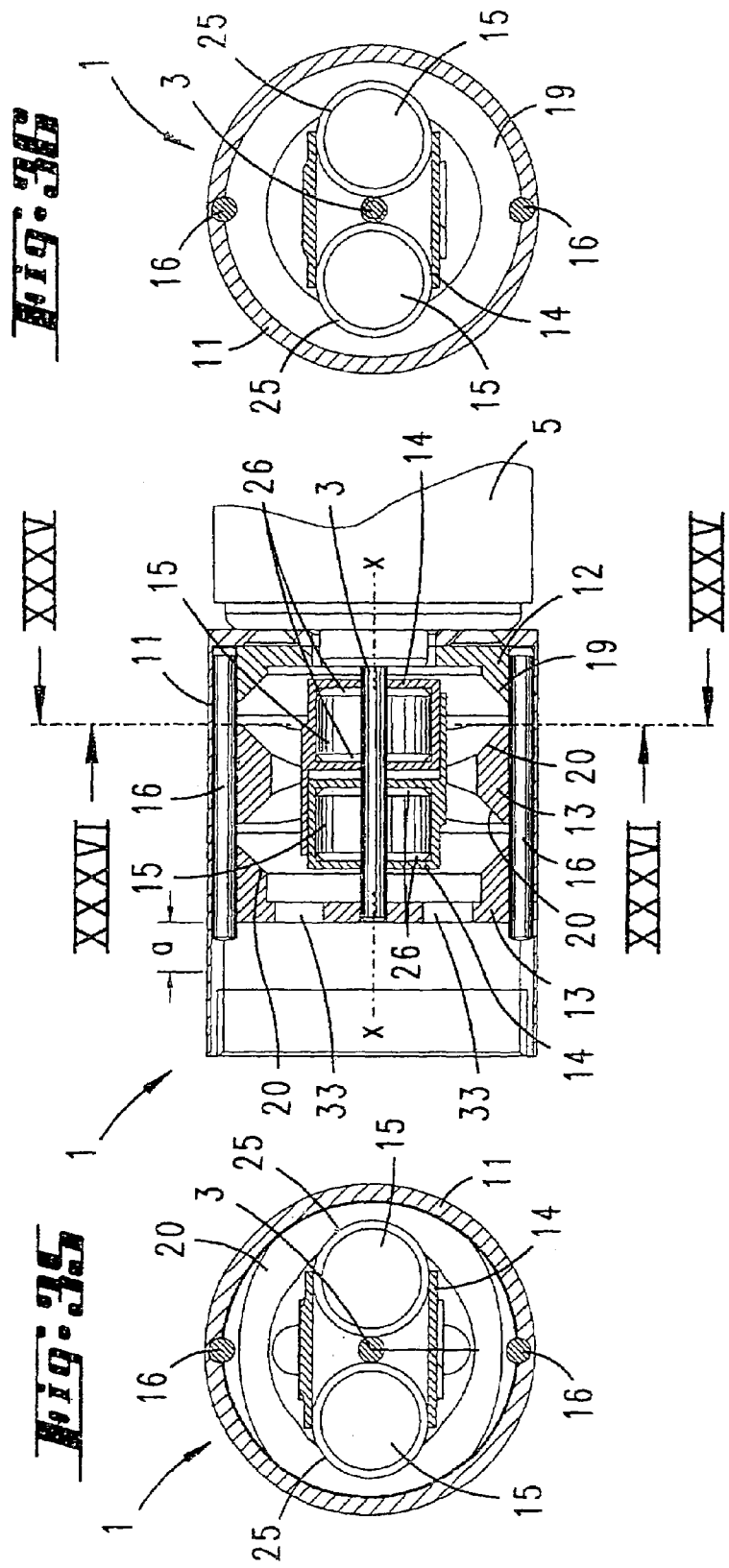

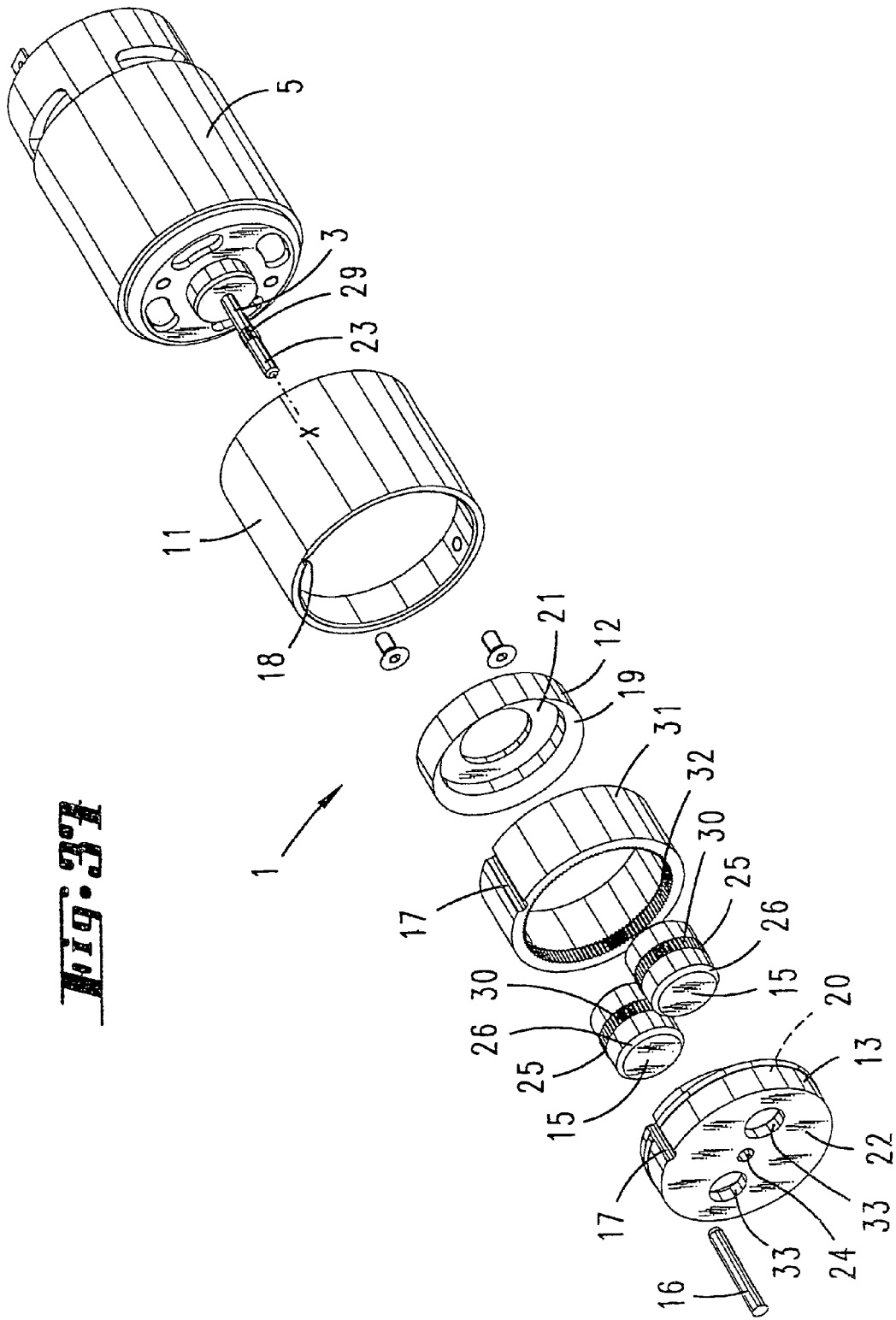

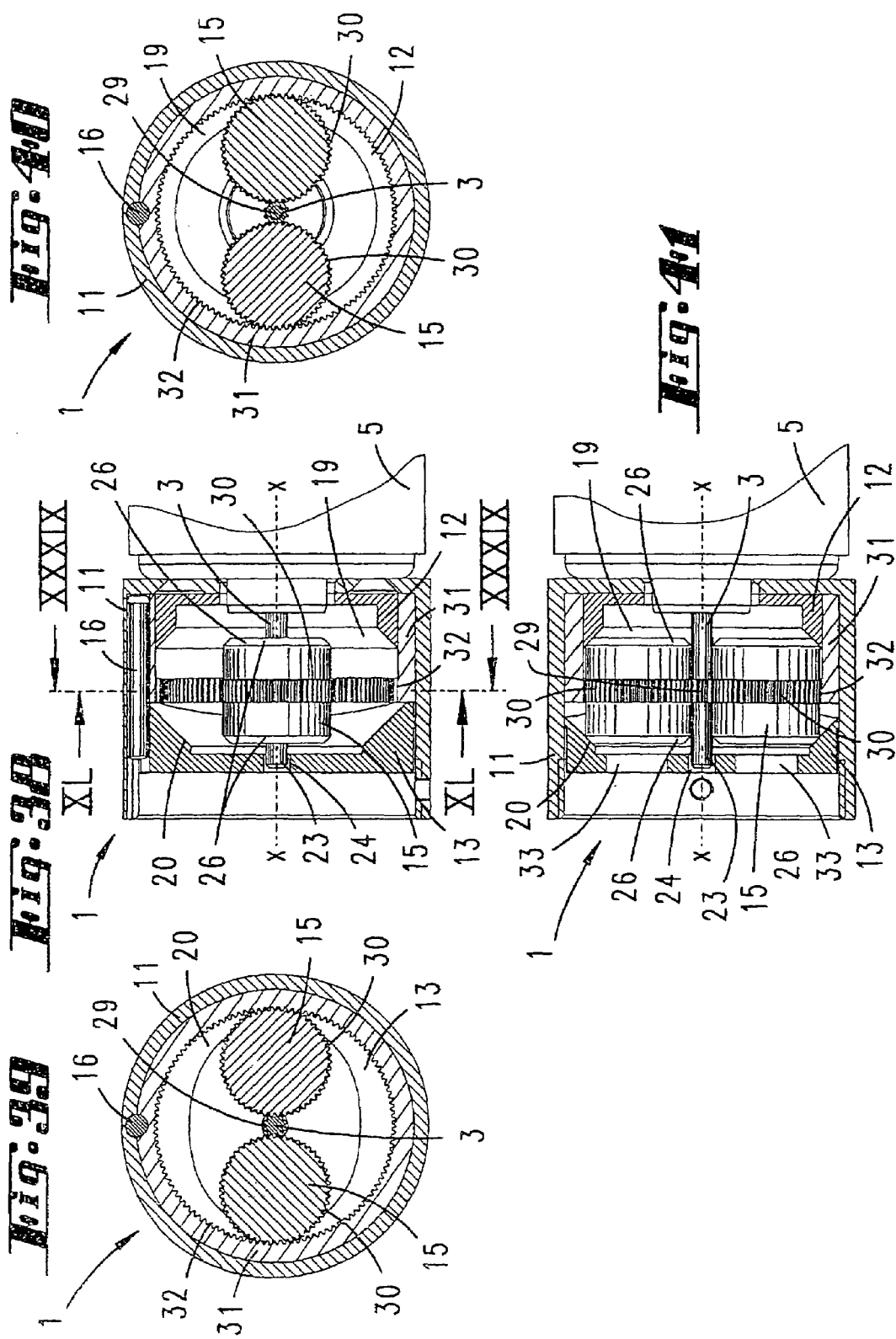

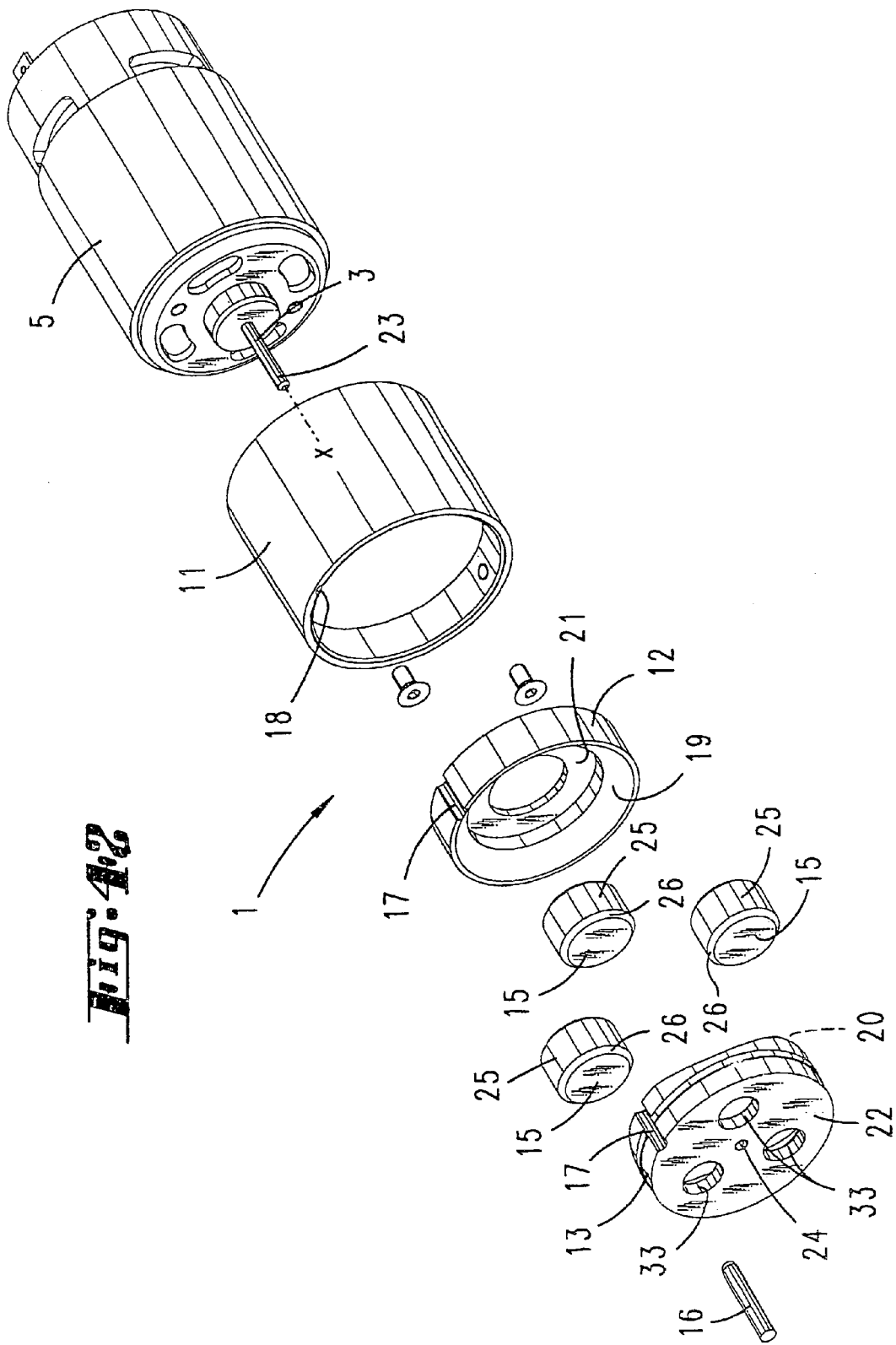

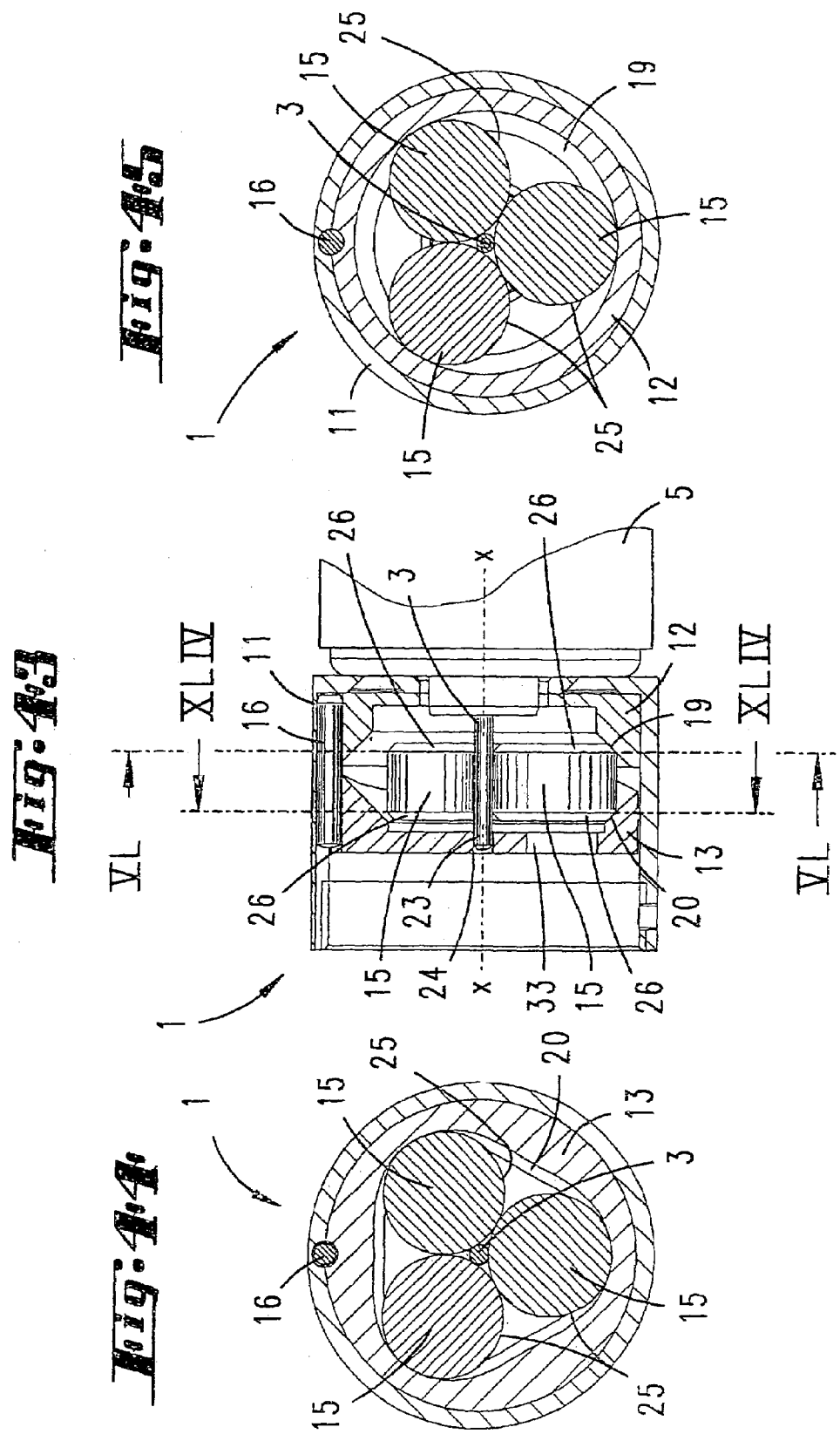

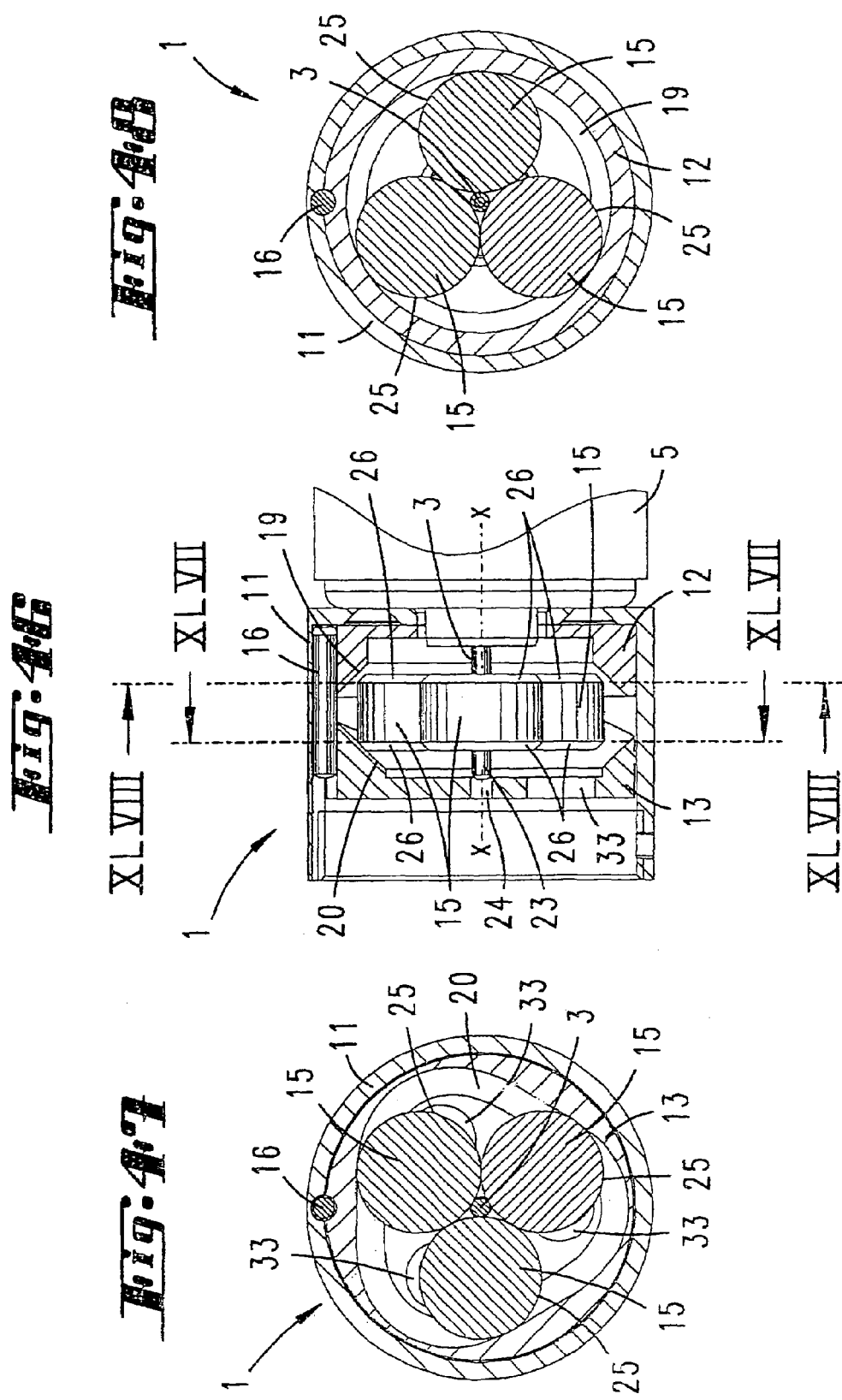

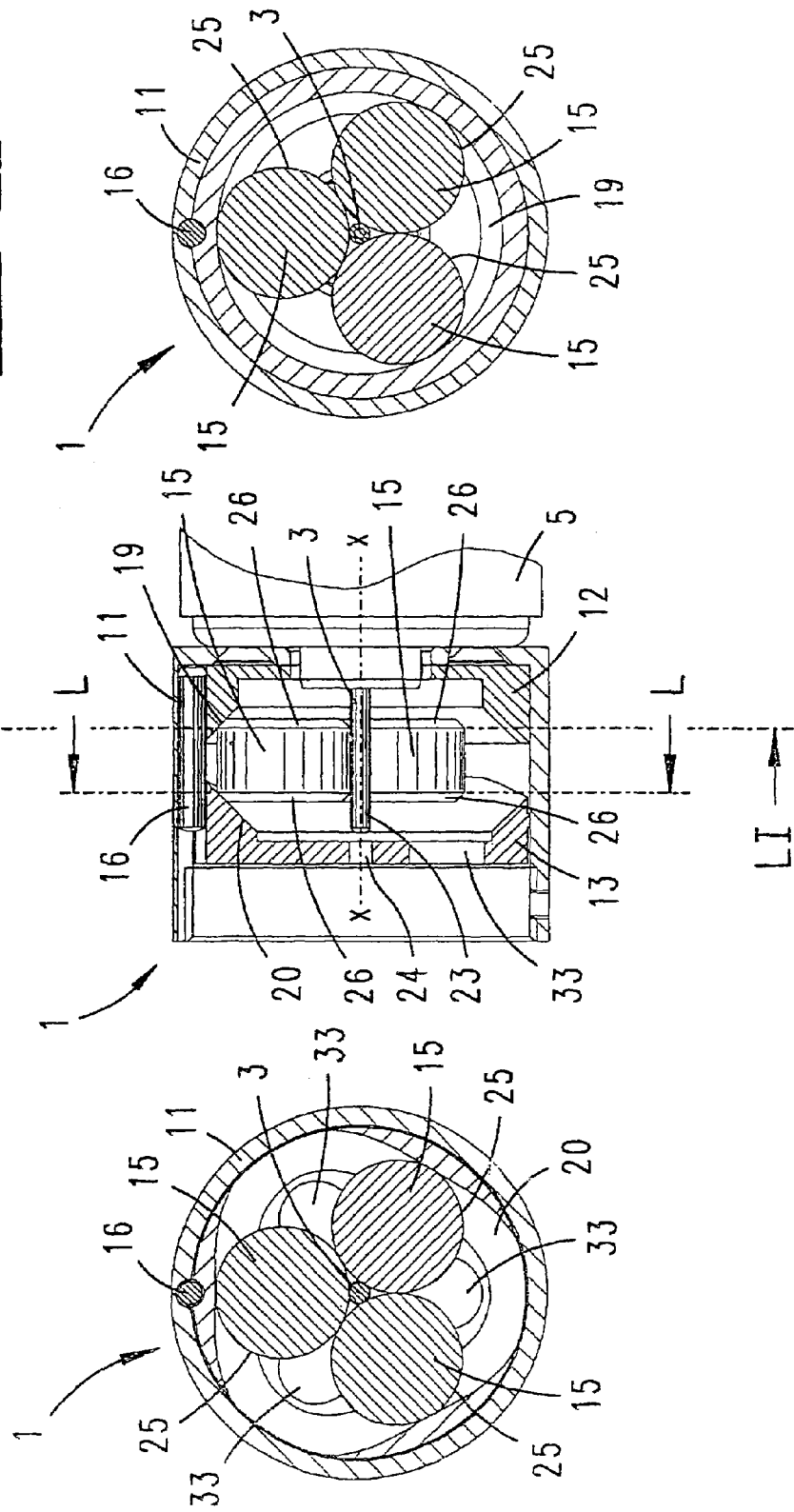

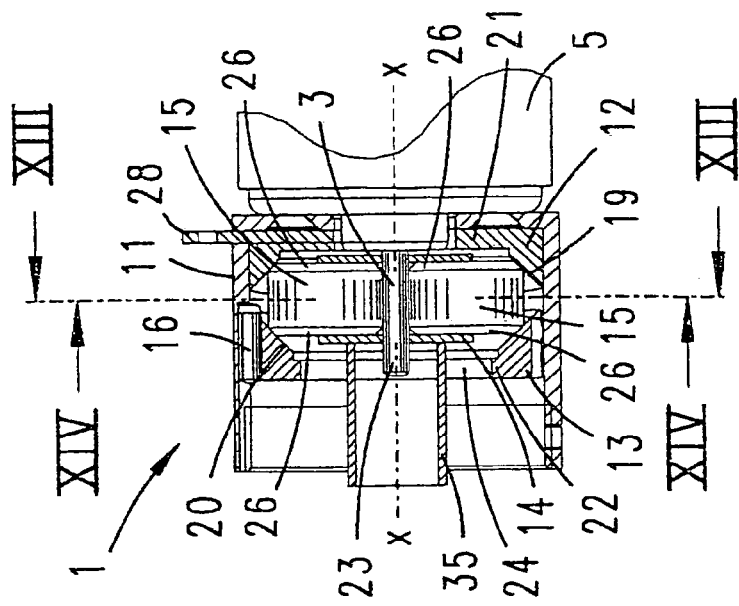
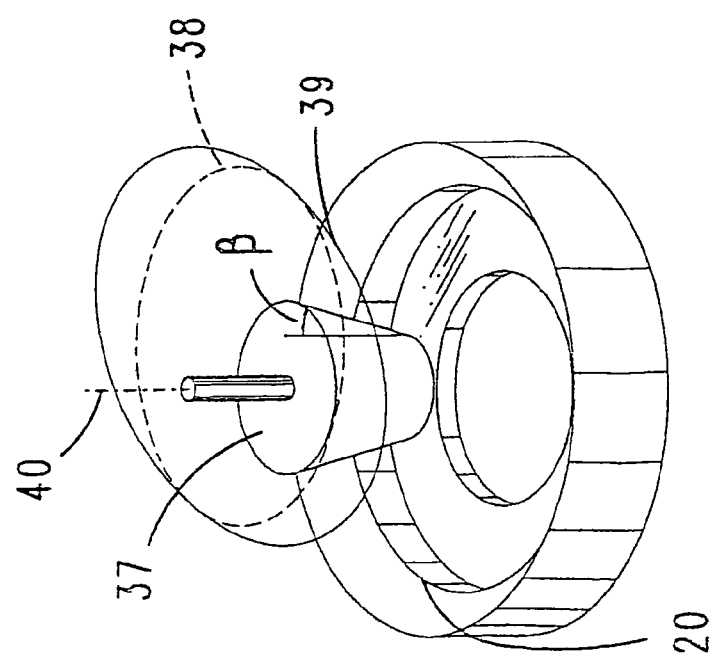

US 7,086,979 B2

FRICTION-WHEEL PLANETARY GEAR FOR CONVERTING A ROTATING MOVEMENT INTO A BACK AND FORTH MOVEMENT WITH DECREASED FREQUENCY

FIELD OF THE INVENTION

The invention relates firstly to a gear mechanism having a gear-mechanism shaft, preferably an output shaft of an electric motor, and output rotary bodies which are in engagement with the gear-mechanism shaft.

BACKGROUND OF THE INVENTION

Gear mechanisms having a gear-mechanism shaft are known and are generally used in electric machines U.S. Pat. No. 4,060,010 to Heden disclose; a camera lens drive formed of a small electric motor and a transmission for driving a lens part The transmission is formed solely by a number of planetary gear sets arranged in series. The planetary gears are ball bearings having adjustable pre-stressing. The pre-stress of a group of input sets is adjustable independently of the pre-stress of a group of output sets.

In view of the prior art described above, one technical problem of the invention is considered to be that of advantageously developing a gear mechanism of the type in question.

SUMMARY OF THE INVENTION

This problem is solved firstly and substantially by the subject matter of claim 1, in which it is provided that the output rotary bodies interact with the gear-mechanism shaft in the radial direction, by bearing against the gear-mechanism shaft, and interact in the axial direction of the gear-mechanism shaft with an (upper) guideway body which can move in the axial direction and is biased or loaded toward the output rotary bodies, with a guideway of the guideway body being structured in terms of its height over its periphery, at least with respect to a circular orbit of revolution of an output rotary body. Moreover, it is preferable for a region of the output shaft which interacts with the output rotary bodies to be circular in cross section. On account of this configuration, the invention creates a gear mechanism by means of which a rotary motion of the gear-mechanism shaft is converted into an axial movement of the guideway body coaxially with respect to the gear-mechanism shaft. In particular, a speed reduction from relatively high rotational speeds of the gear-mechanism shaft to a low rotational speed of revolution of a or the output rotary body/bodies or alternatively of a cage in which, as explained in more detail below, the output rotary body/bodies are accommodated, is also achieved. The gear mechanism, which in a narrower sense can also be classified as a friction gear mechanism, in particular as a planetary friction gear mechanism, in particular also causes the rotary motion of the gear-mechanism shaft to be converted into a reciprocating motion of a guideway body. Specifically, such a motion is a reciprocating motion in the direction of the gear-mechanism shaft.

However, the invention also covers the reverse motion sequence, i.e. the conversion of a reciprocating motion by means of a gear mechanism of this type into a rotary motion. In this case—as seen from the gear mechanism—the gear-mechanism shaft is an output shaft.

The load pressing the guideway body onto the output rotary bodies means that the output rotary bodies are constantly in contact with the guideway. Since the latter is structured in terms of its height, different axial positions of the guideway body will result according to the position of revolution of the output rotary bodies. Accordingly, the rotary motion of the output shaft is converted into a pumping motion of the guideway body. In this case, the gear mechanism is of simple structure, it being possible for the electric motor, which preferably drives the gear-mechanism shaft, and the piston surface which, for example, is directly formed by the guideway bodies, to be provided disposed in succession in the axial direction in a casing. Consequently, it is possible to produce a rod-like device casing.

When the guideway body is formed as a piston, the gear mechanism according to the invention can be used, for example, in an injection pump or an electrically actuable air pump. Applications in which an oil pressure is increased via the piston or the guideway body in order to actuate hydraulic or pneumatic tools are also conceivable. Furthermore, vibration-generating applications are also conceivable, for example with the gear mechanism according to the invention disposed in a cleaning or polishing machine, in which case a corresponding tool can be rotated via the gear-mechanism shaft and the (axial) vibration of the driven tool: is generated via the output rotary bodies acting on the guideway and/or the associated, optionally spring-assisted reciprocating motion of the guideway body.

Furthermore, the invention relates to a motor having an output shaft, preferably an electric motor, the output shaft having a bearing arrangement. To improve a motor, preferably an electric motor of the type in question, in terms of the bearing arrangement for the output shaft, it is proposed for the bearing arrangement to comprise output rotary bodies which interact directly with the output shaft, which output rotary bodies interact with an upper and/or lower guideway body. This configuration produces an output shaft bearing arrangement which is distinguished by a simple structure. In this case, the output rotary bodies are in engagement with the output shaft. This configuration of the bearing arrangement has proven particularly advantageous if the output rotary bodies interact, in the axial direction of the output shaft, with an upper guideway body, which can move in the axial direction and is biased or loaded toward the output rotary bodies, with a guideway of the guideway body being structured in terms of its height over its periphery. Consequently, the arrangement selected, in addition to providing a bearing arrangement for the output shaft, also effects a transformation of the rotary motion of the output shaft into a reciprocating motion of the guideway body, in particular of the upper guideway body, so that as a result, for example, a pump driven by electric motor or a vibration generator is created.

The advantages and refinements listed below relate both to a gear mechanism having a gear-mechanism shaft as described in claim 1 and to motor having an output shaft as described in claim 2, and also to a combination of these subjects of the invention. For the sake of simplicity, the shaft of the motor and of the gear mechanism is referred to in general below as a gear-mechanism shaft (as long as the corresponding text does not refer to the alternative).

Therefore, in an advantageous refinement, the guideway of the upper guideway body, i.e. of the guideway body disposed on that side of the output rotary bodies which is remote from the electric motor, runs such that it is inclined toward the gear-mechanism shaft (as seen from the electric motor toward the upper guideway body), and in cross section includes an acute angle with the longitudinal axis of the gear-mechanism shaft as seen toward the free end of the gear-mechanism shaft. Consequently, the guideway forms a conical surface which leads to pointwise or strictly speaking elliptical contact between the output rotary bodies and the guideway. In this respect, it is preferable for the structuring in terms of height to be produced with respect to a circle which is concentric with the gear-mechanism shaft. For example, the guideway of the guideway body is produced by means of a milling cutter which, however, is guided such that it deviates from a circular shape.

The element which includes the conical surface, i.e. the guideway—this element being the guideway body—is diverted toward the output rotary bodies on account of the loading toward the rear. With regard to the configuration of the output rotary bodies, it is preferable for them to be configured in disk form. By way of example, output rotary bodies in ball form are also conceivable. Furthermore, in particular in the case of a disk-like configuration, it has proven advantageous for the output rotary bodies to be held in a cage, diametrically opposite one another with respect to the gear-mechanism shaft. This configuration ensures radially aligned action on the gear-mechanism shaft or the output shaft.

Furthermore, it has proven particularly advantageous for the output rotary bodies on the opposite side, i.e. on the drive or motor side as appropriate, to interact with a lower guideway body. Accordingly, the output rotary bodies, as seen in the axial direction, are trapped between two guideway bodies, acting on the associated guideway on both sides. In this case too, it is preferable for the guideway of the lower guideway body to run such that it is inclined toward the gear-mechanism shaft, and to include, in cross section, an acute angle with the longitudinal axis of the gear-mechanism shaft or the output shaft, as seen toward the motor-side end of the gear-mechanism shaft or of the output shaft. The angles of inclination of the guideways of the upper and lower guideway bodies may in this case include different angles with respect to the gear-mechanism shaft longitudinal axis, it being possible for the angle of the guideway of the lower guideway body with respect to the gear-mechanism shaft longitudinal axis to be up to 90°. In this respect, it is also conceivable for the guideway of the lower guideway body to be shaped uniformly in terms of height, so that this guideway fulfills the function of a lower supporting surface which is uniform in the direction of revolution of the output rotary bodies. Alternatively, however, it is also possible for the guideway of the lower guideway body to be structured in terms of height over its periphery. In the same way as with the configuration of the guideway of the upper guideway body, it is also preferable for a conical surface to be formed at the lower guideway body, leading to pointwise or strictly speaking elliptical contact between the output rotary body edge and the guideway. Accordingly, not only is the upper guideway body deflected in the axial direction by the output rotary bodies, but furthermore, on account of the structuring of the lower guideway in terms of its height, the output rotary bodies themselves and, with them, the upper guideway body are moved in oscillatory fashion against the loading or biasing. This is an axial, reciprocating motion. The lower guideway body, irrespective of whether it is also structured in terms of its height in its guideway, is a crucial component with regard to the rolling motion of an output rotary body, since an output rotary body is supported on the lower guideway body during rolling and lifting of the upper guideway body. The load on the guideway body is distributed between the two opposite rotary bodies.

According to one configuration, the two guideway bodies are arranged fixed in terms of rotation with respect to the output shaft and the output rotary bodies. However, to offer travel adjustment, in an advantageous configuration it is provided that, at least with structuring of the lower guideway body and upper guideway body in terms of their height, these guideway bodies can be adjusted with respect to one another in the peripheral direction. Structuring the guideway of the lower guideway body in terms of its height also, on account of the associated operational axial motion of the guideway bodies, leads to a load on the gear-mechanism shaft in the axial direction. To alleviate this problem, it is also possible to provide an axially movable shaft, if appropriate on the basis of suitable shaft coupling.

With regard to the interaction of output rotary bodies and gear-mechanism shaft or output shaft, it is proposed for an output rotary body to have a shaft engagement surface which extends parallel to the axis of the gear-mechanism shaft or output shaft. In this respect, it is possible to cause the output rotary bodies to be carried along in a frictionally locking manner by means of the gear-mechanism shaft or the output shaft. Furthermore, there is provision for an output rotary body to have a guideway engagement surface which extends at the same angle with respect to the gear-mechanism shaft as the guideway of the associated guideway body with respect to the gear-mechanism shaft. Accordingly, given a disk-like configuration of the output rotary bodies, it is preferable for these bodies to be chamfered in the region of the revolving peripheral edges. Alternatively, however, it is also possible for an output rotary body to interact, by means of a peripheral edge as guideway engagement surface, with the guideway of the associated guideway body. Furthermore, it is also possible for the peripheral edge, in cross section, to have a curved peripheral edge, for example a peripheral edge which is curved in the shape of a segment of a circle. This, in interaction with the guideway, which runs concavely in the peripheral direction, of the guideway body, results in a particularly advantageous pairing of rolling elements.

According to a further alternative embodiment, the gear-mechanism shaft or the output shaft has peripheral toothing which meshes with peripheral toothing of the output rotary bodies. Output rotary bodies shaped in this manner can also be held in a cage, diametrically opposite one another with respect to the gear-mechanism shaft or the output shaft. On the other hand, it is also possible for the output rotary bodies to mesh with internal toothing of a ring body which accommodates the output rotary bodies and the gear-mechanism shaft. This too ensures radially flush action on the gear-mechanism shaft or the output shaft. To achieve an increase in the frequency of the oscillating motion in relation to a predetermined rotational speed of the gear-mechanism shaft or the output shaft, it is possible to provide three or more output rotary bodies. The guideway of the upper guideway body and if appropriate the guideway of the lower guideway body are also structured in terms of height as a function of the number of output rotary bodies. Further extension of travel can be achieved by providing two or more assemblies of output rotary bodies and an upper guideway body in succession in the axial direction.

The gear mechanism according to the invention is of very simple structure. Both the output rotary bodies and the guideway bodies, which preferably have conically shaped guideways, are simple to produce. They also run more smoothly than known gear mechanisms. A further advantage is that a purely sinusoidal motion is possible. Also, the gear mechanism is of relatively low weight and is favorable in terms of the amount of space which it takes up. To counteract an undesired loss of power as a result of a pumping effect during the oscillating motion of the upper guideway body and if appropriate of the output rotary bodies, it is possible for the upper, axially mobile guideway body to be provided with apertures oriented in the longitudinal extent of the gear-mechanism shaft. The travel of the upper guideway body preferably corresponds to approximately one tenth to one thirtieth of the piston diameter, i.e. the diameter of the guideway body. If the upper guideway body is at the same time intended to serve as a piston which is of closed form, it is expedient to provide suitable ventilation in the radial direction. By way of example, a ventilation opening can be formed in a wall which radially surrounds the gear mechanism.

DESCRIPTION OF THE DRAWINGS

The invention is explained in more detail below on the basis of the appended drawing, which merely illustrates a number of exemplary embodiments and in which:

FIG. 1 shows a perspective, partially sectional illustration of a gear mechanism according to the invention in a first embodiment, disposed in a hydraulic press device;

FIG. 2 shows a longitudinal section through the press device with gear mechanism as shown in FIG. 1;

FIG. 4 shows a perspective, exploded illustration of the first embodiment of the gear mechanism;

FIG. 5 shows an enlarged longitudinal-section illustration through the gear mechanism, relating to the lowermost position of an upper guideway body which forms a piston;

FIG. 6 shows a section on line VI—VI in FIG. 5;

FIG. 7 shows a section on line VII—VII in FIG. 5;

FIG. 8 shows an illustration corresponding to that shown in FIG. 5, but relating to the top dead center position of the upper guideway body;

FIG. 9 shows a section on line IX—IX in FIG. 8;

FIG. 10 shows a section on line X—X in FIG. 8;

FIG. 11 shows a perspective exploded view of a gear mechanism in a second embodiment;

FIG. 12 shows an illustration corresponding to that shown in FIG. 5, but relating to the second embodiment, with a zero travel set;

FIG. 13 shows a section on line XIII—XIII in FIG. 12;

FIG. 14 shows a section on line XIV—XIV in FIG. 12;

FIG. 15 shows a sectional illustration corresponding to that shown in FIG. 12, but with the output rotary bodies in a position which has been displaced through 90° about an output axis;

FIG. 16 shows a section on line XVI—XVI in FIG. 15;

FIG. 17 shows a section on line XVII—XVII in FIG. 15;

FIGS. 18 to 23 show illustrations corresponding to those shown in FIGS. 12 to 17, but with a half-maximum travel set;

FIGS. 24 to 29 show further illustrations corresponding to those shown in FIGS. 12 to 17, but with a maximum travel set;

FIG. 30 shows a further perspective exploded illustration of an alternative embodiment of the gear mechanism;

FIG. 31 shows a longitudinal section through the gear mechanism shown in FIG. 30, with an upper guideway body in a top dead center position;

FIG. 32 shows a section on line XXXII—XXXII in FIG. 31;

FIG. 33 shows a section on line XXXIII—XXXIII in FIG. 31;

FIGS. 34 to 36 show illustrations corresponding to those shown in FIGS. 31 to 33, but relating to the bottom dead center position of the upper guideway body;

FIG. 37 shows a further alternative configuration of the gear mechanism in an exploded illustration;

FIG. 38 shows a longitudinal section through the gear mechanism of the embodiment shown in FIG. 37;

FIG. 39 shows a section on line XXXIX—XXXIX in FIG. 38;

FIG. 40 shows a section on line XL—XL in FIG. 38;

FIG. 41 shows a longitudinal section through the gear mechanism which is offset through 90° with respect to the illustration shown in FIG. 38;

FIG. 42 shows an exploded illustration of a further embodiment of the gear mechanism;

FIG. 43 shows a longitudinal section through the gear mechanism shown in FIG. 42;

FIG. 44 shows a section on line XLIV—XLIV in FIG. 43;

FIG. 45 shows a section on line XLV—XLV in FIG. 43;

FIGS. 46 to 48 show illustrations corresponding to those shown in FIGS. 43 to 45, but after output rotary bodies have been displaced about a gear-mechanism shaft;

FIGS. 49 to 51 show further illustrations corresponding to those shown in FIGS. 43 to 45, but after a further displacement of the output rotary bodies;

FIG. 52 diagrammatically depicts the production of a guideway body with structuring in terms of its height; and FIG. 53 shows an illustration corresponding to that shown in FIG. 5, with the rotational speed reduction utilized with regard to the shaft.

DETAILED DESCRIPTION OF THE ILLUSTRATED EMBODIMENTS

Figure 3D:
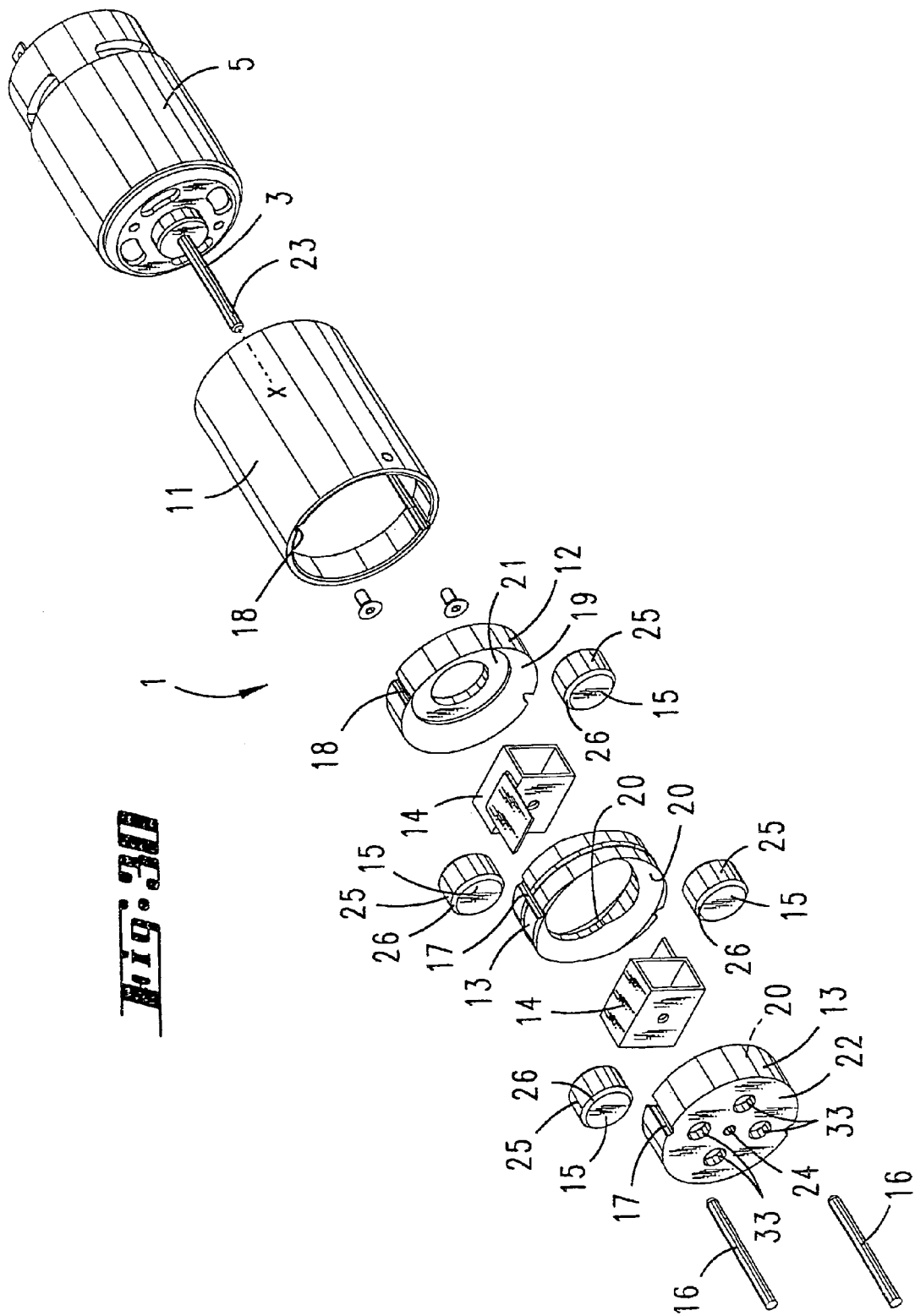
FIG. 3 shows a section on line III—III in FIG. 2.

First of all, with reference to FIGS. 1 to 3, a gear mechanism 1 according to the invention is illustrated and described disposed, as an example, in a hydraulic press device 2.

The hydraulic press device 2 has an electric motor 5 which is provided with a gear-mechanism shaft 3 and in the embodiment illustrated is powered by means of a storage battery 4. The way in which the storage battery 4 is associated with the press device 2 is only diagrammatically depicted in FIG. 1.

By means of the electric motor 5, a piston 6 is moved counter to the force of a compression spring 7 in the press device 2 as a result of an oil pressure being increased. A displaceable press jaw 9, which is displaced toward a stationary press jaw 10 during the pressing operation, is connected to the piston 6 via a piston stem 8.

The configuration of the gear mechanism 1 according to the invention,.which is described in more detail below, results in the rotary motion of the gear-mechanism shaft 3 which is driven by the electric motor 5 being converted into an oscillating pumping motion of a pumping piston 34. This reciprocating pumping motion takes place in the axial direction of the gear-mechanism shaft 3, so that the driven device—in this case the press device 2—can be configured in rod form.

Furthermore, the gear mechanism according to the invention can also be used in other devices in which a pumping motion is to be achieved, for example in injection pumps or air pumps driven by an electric motor. Furthermore, the oscillating motion of the gear-mechanism body can also be used to generate vibrations, for example in cleaning or polishing machines.

FIGS. 4 to 10 show a first embodiment of the gear mechanism according to the invention. The latter is substantially composed of a lower guideway body 12, which is disposed in a cylindrical lateral casing 11, an upper guideway body 13 and two output rotary bodies 15 which are disposed between the guideway bodies 12 and 13 and are held in a cage 14.

The guideway bodies 12 and 13, oriented coaxially with respect to the gear-mechanism shaft 3 of the electric motor 5, are held in a rotationally fixed position in the casing 11, for which purpose, in the exemplary embodiment, a blocking pin 16 rests in a blocking manner, over half the peripheral side, in notches 17, which are oriented parallel to the axis of rotation, of the guideway bodies 12, 13 and over the opposite half of the peripheral side in an inner-wall groove 18, which is correspondingly oriented, in the casing 11.

Each guideway body 12, 13 has guideways 19, 20 which face one another.

The output rotary bodies 15, which are configured in disk form, are disposed between the lower guideway body 12, which faces the electric motor 5, and the upper guideway body 13, which is remote from the electric motor 5, the axes of rotation of these output rotary bodies 15 being oriented parallel to the longitudinal axis x of the output shaft 3.

On both sides, the output rotary bodies 15 interact, by means of their revolving peripheral edges, with the respectively associated guideways 19, 20 of the guideway bodies 12, 13.

As has been mentioned, the output rotary bodies 15 are held in a cage 14, in such a manner that they lie diametrically opposite one another with respect to the gear-mechanism shaft 3. Accordingly, the cage 14 revolves around the gear-mechanism shaft together with the guideway bodies. The speed of rotation of the cage is correspondingly reduced to the speed of rotation of the rotary bodies. This can also be used in structural terms, as emerges, for example, from the exemplary embodiment shown in FIG. 53.

FIG. 53 shows an illustration corresponding to FIG. 5, but with the guideway body 13 formed merely as a peripheral ring and with a hollow shaft 35, which is attached or fixedly connected to the cage 14, passing outward through the guideway body 13. The hollow shaft 35 can be utilized if the speed of revolution of the cage 14, which is lower than that of the shaft 3, is to be utilized for further purposes and the shaft 3 is also to be utilized at the same time (passing through the hollow shaft). If it is not desired to utilize the shaft 3 at the same time, the hollow shaft 35 does not have to be configured as a hollow shaft. In this case, it can also be configured as a solid shaft.

The transmission shaft 3 passes through the base 21 of the lower guideway body 12 and through the center of the cage 14, with an output shaft end 23 projecting beyond the cage 14 at the rear of the latter.

The base 22 of the upper guideway body 13 has in the center, i.e. in the axial extension of the output shaft 3, a bore 24 which is matched to the shaft diameter.

The output rotary bodies 15 each have a shaft engagement surface 25 which is formed by the revolving lateral surface and extends parallel to the longitudinal axis x of the output shaft 3. These engagement surfaces 25, like the surface of the output shaft 3, are of smooth-surfaced form, and accordingly the interaction between output shaft 3 and output rotary bodies 15 is effected by means of frictional locking.

In the region of interaction with the output rotary bodies 15, the gear-mechanism shaft 3 is circular in cross section. The interaction region between the output shaft 3 and the output rotary bodies 15 is correspondingly larger (axial length) than the height (axial length) of the shaft engagement surface 25 of the output rotary bodies 15, on account of the oscillating motion of the output rotary bodies 15 relative to the gear-mechanism shaft 3. The output rotary bodies 15 are in continuous contact with the gear-mechanism shaft 3 by means of the shaft engagement surfaces 25 through an entire cycle of the oscillating motion. In the interaction region, and preferably also beyond it, the gear-mechanism shaft 3 also preferably has the same circular cross section over its entire length.

The guideways 19, 20 of the two guideway bodies 12, 13 run such that they are inclined toward the gear-mechanism shaft 3, the guideway 19 of the lower guideway body 12, in cross section, including an acute angle alpha with the longitudinal axis x of the gear-mechanism shaft 3, as seen toward the motor-side end of the gear-mechanism shaft 3, and the guideway 20 of the upper guideway body 13, likewise in cross section, includes an acute angle beta with the longitudinal axis x of the gear-mechanism shaft 3, as seen toward the free end 23 of the gear-mechanism shaft 3. In the exemplary embodiment, angles alpha and beta are each selected to be approx. 45°.

This configuration of the guideways 19, 20 leads to the formation of conical surfaces with which the revolving peripheral edges of the output rotary bodies 15 interact. As illustrated, these peripheral edges, which form guideway engagement surfaces 26, are preferably chamfered, so that these engagement surfaces 26 extend at the same angle with respect to the gear-mechanism shaft 3 as the associated guideways 19 and 20 with respect to the gear-mechanism shaft 3.

Furthermore, the upper guideway body 13 is held in such a manner that it can be displaced in the axial direction in the lateral casing 11, and is biased toward the output rotary bodies 15. When the gear mechanism 1 is used in a press device 2 as described in the introduction, this biasing is achieved by the compression spring 35 acting on the pumping piston 34. In principle, the weight of a part acting on the upper guideway body may also be sufficient.

On account of this biasing of the upper guideway body 13, the output rotary bodies 15 are always acted on in an axially inward direction, so that the frictional lock between them and the gear-mechanism shaft 3 is ensured.

With respect to a basic contour, the guideway 19 of the lower guideway body 12 is milled out of the guideway body 12 so as to correspond to a circular shape. Consequently, the guideway engagement surfaces 26 of the output rotary bodies 15 interact with a circular path of revolution of the lower guideway 19.

If the guideway 20 of the upper guideway body 13 is produced in the same way as the lower guideway 19, i.e. with a circular basic contour, a (drive) shaft bearing arrangement which is simple to produce, easy to assemble and independent of tolerances is achieved. In order, furthermore, to use this arrangement to produce a piston pump or a vibration generator, the guideway 20 of the upper guideway body 13 is produced so as to deviate from a circular shape, for example by means of a milling cutter, so that in an arrangement as presented above an elliptical basic contour of the upper guideway 20 results, with the cone angle beta with respect to the gear-mechanism shaft 3 remaining the same. Consequently, the guideway 20 of the upper guideway body 13 is structured in terms of its height over the periphery with respect to the output rotary bodies 15, which interact with the guideway 20 and revolve on a circular orbit, as seen from the output rotary bodies.

On account of this configuration of the guideway, the biasing results in the upper guideway body 13 being adapted in terms of its height by axial displacement thereof during the revolution of the output rotary bodies 15 which are driven by the gear-mechanism shaft 3.

The illustrations presented in FIGS. 5 to 10 show positions of the output rotary bodies 15 in which the latter pass through the guideway zones of the upper guideway body 13 with the smallest radius of the elliptical basic contour with respect to the longitudinal axis x. Consequently, the upper guideway body 13 has been moved into the axially uppermost position in the manner of a piston (cf. FIGS. 5 to 7).

During the further rotation of the output rotary bodies 15, the latter pass through the guideway zones with a larger radius of the elliptical basic contour, which on account of the conically uniform configuration of the guideway 20 leads to the upper guideway body 13 being displaced on account of the given biasing into a lowermost position, i.e. toward the output rotary bodies 15 (cf. FIGS. 8 to 10). The constant revolution of the output rotary bodies 15 accordingly effects an oscillating motion of the upper guideway body 13.

The illustrations presented in FIGS. 5 (or 6, 7) and 8 (or 9, 10) therefore represent sectional planes through contact points between the output rotary bodies 15 and the guideway body 13 which are located at axially different positions.

In this case, a measure a of the travel is dependent on the ratio of the different radii of the guideway zones.

FIG. 52 diagrammatically depicts one possible way of producing a guideway body with a guideway 20 which is structured in terms of its height in the sense of the present application. A milling cutter 37 is guided along an elliptical path 39 with respect to its axis of rotation 40. The milling-cutter angle beta results in the conical configuration of the guideway 20. The deviation of the ellipse 39 from a theoretical circular orbit 38 results, based on the theoretical circular orbit 38, in the structuring of the guideway 20 in terms of its height.

Contrary to the exemplary embodiment described above with asymmetrical guideways 19 and 20, FIGS. 11 to 29 show an embodiment in which the guideways 19 and 20 are structured so as to be symmetrical, i.e. uniformly in terms of height over the respective periphery (with respect to a circular orbit this means: with the same difference). This offers the option of automatic (for example automatic matching to the operating pressure or counterpressure on the upper guideway body), manual or motorized travel adjustment, for which purpose the lower guideway body 12 can be rotationally displaced over a rotation angle of preferably 90° in the lateral casing 11. A particular position of the guideway bodies with respect to one another in terms of their peripheries can then also be locked in a suitable way, for example by a releasable catch, in order to maintain the peripheral forces which occur during operation without adjusting the selected position. However, the holding and adjustment forces are surprisingly low. A handling lug 28 which is secured to the lower guideway body 12 and passes through the lateral casing 11 in the region of a longitudinal slot 27 is provided for handling purposes.

With the aid of this handling lug 28, it is possible to achieve a manual rotary displacement of the upper guideway body 13, with the upper guideway body 13 disposed in a rotationally fixed position. Accordingly, the guideway bodies 12, 13 can be adjusted with respect to one another in terms of their respective peripheries.

FIGS. 12 to 17 show the function of the gear mechanism 1 in a position A0 of the lower guideway body 12, in which position A0 the measure a of the travel is equal to zero. The guideways 19, 20 of the guideway bodies 12 and 13 are disposed offset through 90° with respect to one another, so that a valley of the structuring in terms of height of one guideway is positioned opposite a peak of the other guideway. Accordingly, the output rotary bodies 15 revolving over the gear-mechanism shaft 3 do not effect any displacement of the upper guideway body 13 in terms of its height, i.e. in the axial direction. Rather, the output rotary bodies 15, in accordance with the structuring of the guideways 19, 20 in terms of their height, roll parallel to the longitudinal axis x over the gear-mechanism shaft 3 together with the cage 14 which holds the output rotary bodies.

In FIGS. 18 to 23, the lower guideway body 12 has been rotationally displaced into a position A1, which position corresponds to half the maximum travel. In this position, the guideways 19 and 20 of the guideway bodies 12 and 13 are offset by 45° with respect to one another in terms of their peripheries. In this half-maximum position, the oscillating motion of the output rotary bodies 15 on the gear-mechanism shaft 3, which is known from the zero position, has superimposed on it a reciprocating motion of the upper guideway body 13 along the longitudinal axis x.

The maximum travel displacement A2 is shown in FIGS. 24 to 29. In this position, the guideways 19, 20 are oriented in the same way with respect to the elliptical production basic contour in terms of their peripheries, on account of the lower guideway body 12 having been pivoted through 90° with respect to the zero position, so that a peak of the structuring of one guideway in terms of its height likewise lies opposite a peak of the other guideway. Accordingly, the valleys of the height structures are also oriented opposite one another. Consequently, a maximum measure a of the travel has been reached.

A third embodiment of the gear mechanism 1 according to the invention is illustrated in FIGS. 30 to 36. This embodiment substantially relates to a two-stage gear mechanism in terms of the generation of travel (single-stage with regard to rotational speed, for example), in accordance with the first embodiment, with in each case two output rotary bodies 15 per stage. In this case too, a lower guideway body 12, which faces the electric motor 5 and has a guideway 19 which is structured uniformly in terms of its height, is provided.

As seen in the axial direction, the upper guideway body 13, which is responsible for the first stage, i.e. the stage facing the electric motor 5, is provided with a guideway 20 on both sides. Accordingly, these guideways 20 of the middle guideway body are structured in terms of their height, with one guideway 20 being disposed so as to face the first stage and the other guideway 20 being disposed so as to face the second stage.

The upper guideway body 13, which closes off the second stage and is disposed remote from the electric motor 5, has a guideway 20 which, in terms of its height, is formed in the same way as the guideway 19 of the lower guideway body 12.

The pairs of output rotary bodies 15 which are associated with each stage are in each case held diametrically opposite one another with respect to the gear-mechanism shaft 3, in a cage 14, it being possible for these pairs of output rotary bodies 15 to be displaced independently of one another on the gear-mechanism shaft 3 during the rotary motion.

The selected two-stage nature of the gear mechanism 1 results in an increased travel measure a.

As can be seen from the illustrations, in this case, as also in the first exemplary embodiment, all the guideway bodies are secured against rotation by means of blocking pins 16.

In this case, however, as an alternative it is also possible for both the bottom guideway of the first stage and the top guideway of the second stage to be structured in terms of their height and for the middle guideway body to be held in a rotationally displaceable manner in the casing 11 in order to produce the travel, so that a two-stage gear mechanism with a travel adjustment—as has been described on the basis of the second exemplary embodiment—can be achieved.

Furthermore, it is also possible to select an embodiment of the gear mechanism as shown in FIGS. 37 to 41. This embodiment is firstly and substantially a gear mechanism in accordance with the first embodiment, but in this case the output shaft 3 has peripheral toothing 29, which meshes with peripheral toothing 30 of the output rotary bodies. Moreover, a ring body 31 which accommodates the output rotary bodies 15 and the gear-mechanism shaft 3 is provided in the casing 11. This ring body has internal toothing 32 which meshes with the peripheral toothing 30 of the output rotary bodies 15.

As can be seen from the illustrations, asymmetric guideways 19, 20 are provided. Accordingly, the output rotary bodies 15 retain their axial position on the gear-mechanism shaft 3. On the other hand, if symmetrical guideways 19, 20 are provided in accordance with the second embodiment, the axial displaceability of the output rotary bodies 15 means that the peripheral toothing 29 of the gear-mechanism shaft 3 and the internal toothing 32 of the ring body 31 can be adjusted accordingly in terms of their length measured in the axial direction.

Finally, FIGS. 42 to 51 show a further alternative configuration of the gear mechanism 1 with asymmetrically configured guideways 19, 20, i.e. a lower guideway, which is formed uniformly in terms of its height, and an upper guideway 20, which is structured in terms of its height.

Unlike in the exemplary embodiments described above, in this case three output rotary bodies 15 are positioned around the output shaft 3. This measure makes it possible to achieve a higher frequency by using a corresponding formation of the basic contour of the upper guideway 20, which is structured in terms of its height. For this purpose, the upper guideway 20 has a triangular basic contour with corner regions which are rounded so as to match the radii of the output rotary bodies 15.

The provision of three output rotary bodies 15 means that the maximum travel of the upper guideway body 13, which forms a piston or vibration body, is reached every 120° of the rotary motion.

In order to prevent a reduced pressure, which has an adverse effect on functioning, from being built up in the gear mechanism 1 during the travel motion of the upper guideway body 13, it is preferable for apertures 33 to be provided in the base 22 of the upper guideway body 13.

All features disclosed are (inherently) pertinent to the invention. The content of disclosure of the associated/appended priority documents (copy of the prior application) is hereby incorporated in its entirety in the disclosure of the application, partly with a view to incorporating features of these documents in claims of the present application.

The invention claimed is:

1. A gear mechanism comprising: a gear-mechanism shaft, an upper guideway body having a guideway, and output rotary bodies which are in engagement with the gear-mechanism shaft, the output rotary bodies interact with the gear-mechanism shaft in the radial direction, by bearing against the gear-mechanism shaft, and interact in the axial direction of the gear-mechanism shaft with the upper guideway body which can move in the axial direction and is loaded toward the output rotary bodies, an interaction region of the gear-mechanism shaft having a circular cross section, and the guideway of the upper guideway body is structured in terms of its height over its periphery in relation to a circumferential circular orbit of the output rotary bodies, so that a to and fro movement of the upper guideway body in the direction of the gear mechanism shaft results.

2. A motor, comprising: an output shaft, the output shaft having a radial bearing arrangement, the bearing arrangement including an upper guideway body having a guideway, and output rotary bodies which interact directly with the output shaft, in that the output rotary bodies are circular in cross section, and the output shaft is circular in cross section in the interaction region, and in that the output rotary bodies interact with the upper guideway body, the guideway of the upper guideway body is structured in terms of its height over its periphery in relation to a circumferential circular orbit of the output rotary bodies, so that a to and fro movement of the upper guideway body in direction of the output shaft results.

3. A gear mechanism according to claim 1, wherein the axes of rotation of the output rotary bodies revolve on a circular orbit.

4. A gear mechanism according claim 1, wherein at least one of said output rotary bodies is circular in cross section.

5. A gear mechanism according to claim 1, wherein the gear-mechanism shaft is circular in cross section in the region of interaction with the output rotary bodies.

6. A gear mechanism according to claim 1, wherein the gear mechanism is a speed reduction gear mechanism, and in that the output rotary bodies which are used to bearingly support the gear-mechanism shaft revolve at a significantly lower frequency than the rotational frequency of the gear-mechanism shaft.

7. A gear mechanism according to claim 1, wherein the gear-mechanism shaft has a continuous circular cross section.

8. A gear mechanism according to claim 1, wherein the output rotary bodies execute an oscillating movement relative to the gear-mechanism shaft while always remaining in contact with the gear-mechanism shaft.

9. A gear mechanism according to claim 1, wherein the guideway of the upper guideway body runs such that it is inclined toward the gear-mechanism shaft, said guideway, in cross section, including an acute angle with a longitudinal axis of the gear-mechanism shaft as seen toward a free end of the gear-mechanism shaft.

10. A gear mechanism according to claim 1, wherein the structuring over the height is produced relative to a circle which is concentric with respect to the gear-mechanism shaft.

11. A gear mechanism according to claim 1, wherein the output rotary bodies are configured in disk form.

12. A gear mechanism according to claim 1, wherein the output rotary bodies are held in a cage, diametrically opposite one another with respect to the gear-mechanism shaft.

13. A gear mechanism according to claim 1, wherein the output rotary bodies interact with a lower guideway body.

14. A gear mechanism according to claim 13, wherein a guideway of the lower guideway body runs such that it is inclined toward the gear-mechanism shaft, including, in cross section, an acute angle with a longitudinal axis of the gear-mechanism shaft.

15. A gear mechanism according to claim 13, wherein a guideway of the lower guideway body is structured in terms of its height over its periphery in relation to a circumferential circular orbit of the output rotary bodies, so that a to and fro movement of the upper guideway body in direction of the gear mechanism shaft results.

16. A gear mechanism according to claim 13, wherein at least with structuring of the lower guideway body and upper guideway body in terms of their height, these two components can be adjusted in terms of their periphery with respect to one another in the peripheral direction.

17. A gear mechanism according to claim 1, wherein at least one of said output rotary bodies has a shaft engagement surface which extends parallel to the axis of the gear-mechanism shaft.

18. A gear mechanism according to claim 13, wherein at least one of said output rotary bodies has a guideway engagement surface which extends at the same angle with respect to the gear-mechanism shaft as the guideway of the associated guideway body with respect to the gear-mechanism shaft.

19. A gear mechanism according to claim 13, wherein at least one of said output rotary bodies interacts, by means of a peripheral edge as a guideway engagement surface, with the guideway of the associated guideway body.

20. A gear mechanism according to claim 1, wherein the gear mechanism shaft has peripheral toothing which meshes with peripheral toothing on the output rotary bodies.

21. A gear mechanism according claim 1, wherein the output rotary bodies mesh with internal toothing of a ring body which accommodates the output rotary bodies and the gear-mechanism shaft.

22. A gear mechanism according to claim 1, wherein three or more output rotary bodies are provided.

23. A gear mechanism according to claim 1, wherein two or more assemblies of output rotary bodies and an upper guideway body are provided in succession in the axial direction.

24. A motor according to claim 2, wherein the axes of rotation of the output rotary bodies revolve on a circular orbit.

25. A motor according to claim 2, wherein at least one of said output rotary bodies is circular in cross section.

26. A motor according to claim 2, wherein the gear-mechanism shaft is circular in cross section in the region of interaction with the output rotary bodies.

27. A motor according to claim 2, wherein the gear mechanism is a speed reduction gear mechanism, and in that the output rotary bodies which are used to bearingly support the gear-mechanism shaft revolve at a significantly lower frequency than the rotational frequency of the gear-mechanism shaft.

28. A motor according to claim 2, wherein the gear-mechanism shaft has a continuous circular cross section.

29. A motor according to claim 2, wherein the output rotary bodies execute an oscillating movement relative to the gear-mechanism shaft while always remaining in contact with the latter.

30. A motor according to claim 2, wherein the guideway of the upper guideway body runs such that it is inclined toward the gear-mechanism shaft, said guideway, in cross section, including an acute angle with a longitudinal axis of the output shaft as seen toward a free end of the output shaft.

31. A motor according to claim 2, wherein the structuring over the height is produced relative to a circle which is concentric with respect to the output shaft.

32. A motor according to claim 2, wherein the output rotary bodies are configured in disk form.

33. A motor according to claim 2, wherein the output rotary bodies are held in a cage, diametrically opposite one another with respect to the output shaft.

34. A motor according to claim 2, wherein the output rotary bodies interact with a lower guideway body.

35. A motor according to claim 34, wherein a guideway of the lower guideway body runs such that it is inclined toward the output shaft, including, in cross section, an acute angle with a longitudinal axis of the output shaft, as seen toward the motor-side end of the output shaft.

36. A motor according to claim 34, wherein a guideway of the lower guideway body is structured in terms of its height over its periphery.

37. A motor according to claim 34, wherein at least with structuring of the lower guideway body and upper guideway body in terms of their height, these two components can be adjusted in terms of their periphery with respect to one another in the peripheral direction.

38. A motor according to claim 2, wherein at least one of said output rotary bodies has a shaft engagement surface which extends parallel to the axis of the output shaft.

39. A motor according to claim 34, wherein each said output rotary body has a guideway engagement surface which extends at the same angle with respect to the output shaft as the guideway of the associated guideway body with respect to the output shaft.

40. A motor according to claim 34, wherein each said output rotary body interacts, by means of a peripheral edge as guideway engagement surface, with the guideway of the associated guideway body.

41. A motor according to claim 2, wherein the output shaft has peripheral toothing which meshes with peripheral toothing on the output rotary bodies.

42. A motor according to claim 2, wherein the output rotary bodies mesh with internal toothing of a ring body which accommodates the output rotary bodies and the output shaft.

43. A motor according to claim 2, wherein three or more output rotary bodies are provided.

44. A motor according to claim 2, wherein two or more assemblies of output rotary bodies and an upper guideway body are provided in succession in the axial direction.

* * * * *